United States Patent
Okamura et al.

(10) Patent No.: US 9,544,463 B2
(45) Date of Patent: Jan. 10, 2017

(54) INFORMATION PROCESSING APPARATUS AND INFORMATION PROCESSING SYSTEM

(71) Applicants: Tomoaki Okamura, Tokyo (JP); Yasushi Yanagida, Kanagawa (JP)

(72) Inventors: Tomoaki Okamura, Tokyo (JP); Yasushi Yanagida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/067,379

(22) Filed: Mar. 11, 2016

(65) Prior Publication Data

US 2016/0277627 A1 Sep. 22, 2016

(30) Foreign Application Priority Data

Mar. 18, 2015 (JP) .................................. 2015-055301

(51) Int. Cl.
| | | |
|---|---|---|
| *G06F 15/00* | (2006.01) | |
| *G06K 1/00* | (2006.01) | |
| *G06K 15/02* | (2006.01) | |
| *H04N 1/23* | (2006.01) | |
| *H04N 1/00* | (2006.01) | |

(52) U.S. Cl.
CPC .......... *H04N 1/2307* (2013.01); *H04N 1/0044* (2013.01); *H04N 1/00307* (2013.01); *H04N 1/00464* (2013.01); *H04N 1/233* (2013.01); *H04N 1/2323* (2013.01); *H04N 2201/0094* (2013.01)

(58) Field of Classification Search
CPC H04N 1/2307; H04N 1/00464; H04N 1/0044; H04N 1/00307; H04N 1/233; H04N 1/2323; H04N 2201/0094

USPC .......................... 358/1.1, 1.13, 1.2, 1.9, 1.15
See application file for complete search history.

(56) References Cited

U.S. PATENT DOCUMENTS

| | | | |
|---|---|---|---|
| 7,962,058 B2 | 6/2011 | Okamura | |
| 8,781,389 B2 | 7/2014 | Yanagida | |
| 8,810,854 B2 | 8/2014 | Okamura | |
| 2005/0190986 A1* | 9/2005 | Sakurai | G06T 3/0006 382/275 |
| 2009/0046182 A1* | 2/2009 | Adams, Jr. | H04N 9/045 348/273 |

(Continued)

FOREIGN PATENT DOCUMENTS

| | | |
|---|---|---|
| JP | H11-143670 | 5/1999 |
| JP | 2007-018287 | 1/2007 |
| JP | 2012-137838 | 7/2012 |

*Primary Examiner* — Douglas Tran
(74) *Attorney, Agent, or Firm* — IPUSA, PLLC

(57) ABSTRACT

An information processing apparatus includes an image acquisition unit that acquires an initial image to be output by an image output apparatus; an image determining unit that determines, based on an output condition to be implemented by the image output apparatus upon outputting the initial image and image data of the initial image, whether to change the initial image to a substitute image having a higher image quality than the initial image; an image searching unit that searches for the substitute image in a case where a determination is made by the image determining unit to change the initial image to the substitute image; an output data generating unit that generates output data including image data of the substitute image found by the image searching unit; and a transmitting unit configured to transmit the output data to the image output apparatus.

7 Claims, 16 Drawing Sheets

(56) References Cited

U.S. PATENT DOCUMENTS

2012/0166934 A1    6/2012   Kihara
2014/0286669 A1    9/2014   Yanagida
2016/0034793 A1    2/2016   Okamura \* cited by examiner

| DOCUMENT SIZE (A4:210x297mm) |
|---|
| PRINT RESOLUTION (600dpi) |
| OUTPUT PAPER SIZE (A3:297x420mm) |

| IDENTIFIER |
|---|
| SIZE |
| WIDTH (PIXELS) |
| HEIGHT (PIXELS) |
| IMAGE INFORMATION |

INFORMATION PROCESSING APPARATUS AND INFORMATION PROCESSING SYSTEM

BACKGROUND OF THE INVENTION

1. Field of the Invention

The present invention relates to an information processing system.

2. Description of the Related Art

Techniques are known for printing a web page, viewed using an application of a smart device, such as a smartphone at an image forming apparatus such as an MFP (multifunction peripheral).

For example, Japanese Laid-Open Patent Publication No. H11-143670 describes a technique for printing an image of a web page according to the resolution of the printer by generating a PDL (page description language) file that includes a high-resolution bitmap image compatible with the printer resolution.

The pixel density of the display of an information processing apparatus is typically within a range of approximately 200 dpi (dots per inch) to 400 dpi. On the other hand, the print resolution of an image forming apparatus may be within a range of 600 dpi to 4800 dpi. When there is a large difference between the pixel density (dpi or ppi (pixels per inch)) of the display of an information processing apparatus, such as a smart device, and the print resolution (dpi) of an image forming apparatus, there may be cases where an image may look fine when viewed on the display of the smart device but look rather rough and grainy when printed. That is, there is a substantial difference between the size of the image displayed on a display of a smart device and the size of the image when printed on paper. As such, when the image is printed at a low resolution, even if the image may look fine when viewed on the small display of the smart device, the image may look rough and grainy when it is enlarged and printed on a paper size much larger than the display. In this case, a user may notice that the printed image has become rough and grainy.

Also, when printing an image displayed by an information processing apparatus such as a PC at an image forming apparatus, the pixel density of the display of a PC is about 100 dpi, and there is a large difference between the pixel density of the display of the PC and the print resolution of the image forming apparatus. As such, even if the image to be printed by the image forming apparatus may be displayed on the display of the PC in a size comparable to the image to be printed by the image forming apparatus, the capability of the PC display to accurately display the image to be printed may be limited due to the difference in the pixel density of the PC display and the print resolution of the image forming apparatus. Thus, even if the image forming apparatus is capable of printing an image at a high resolution, the user may not be able to determine, through visual inspection, an image that could effectively utilize the functions of the image forming apparatus, for example. Such a problem also applies to the case of using a smart device to print an image with the image forming apparatus.

SUMMARY OF THE INVENTION

It is a general object of at least one embodiment of the present invention to provide an improved technique for printing a display image of a web page or the like that is viewed using an application of an information processing apparatus.

According to one embodiment of the present invention, an information processing apparatus is provided that is connectable to an image output apparatus via a network. The information processing apparatus includes an image acquisition unit configured to acquire an initial image to be output by the image output apparatus; an image determining unit configured to determine, based on an output condition to be implemented by the image output apparatus upon outputting the initial image and image data of the initial image, whether to change the initial image to a substitute image having a higher image quality than the initial image; an image searching unit configured to search for the substitute image in a case where a determination is made by the image determining unit to change the initial image to the substitute image; an output data generating unit configured to generate output data including image data of the substitute image found by the image searching unit; and a transmitting unit configured to transmit the output data to the image output apparatus.

DESCRIPTION OF THE PREFERRED EMBODIMENTS

Figure 1:
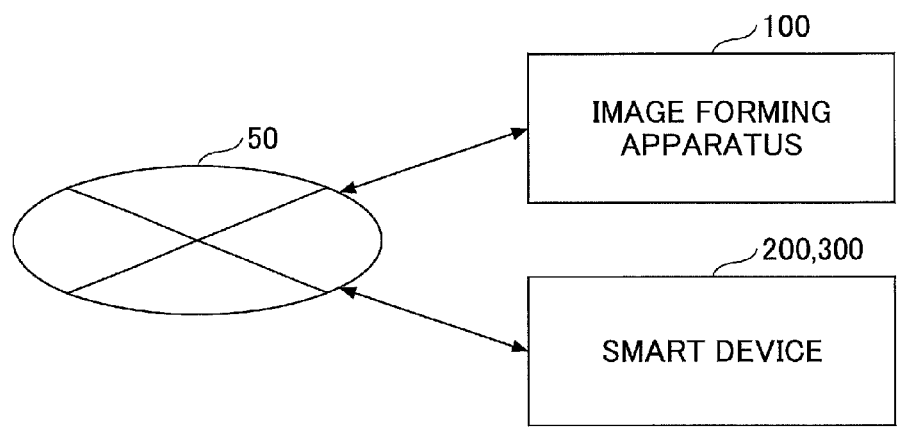
FIG. 1 is a diagram showing an example configuration of an image forming system according to an embodiment of the present invention.

In the following, embodiments of the present invention are described with reference to the accompanying drawings. Note, however, that the embodiments described below are merely illustrative examples and are not to be construed to limit the scope of the present invention. Note, also, that elements illustrated in the drawings that have substantially the same features or functions are given the same reference numerals and redundant descriptions may be omitted.

FIRST EMBODIMENT

Image Forming System

FIG. 1 shows an example configuration of an image forming system according to a first embodiment of the present invention. In FIG. 1, the image forming system includes an image forming apparatus 100 and a smart device 200/300. The image forming apparatus 100 and the smart device 200/300 are connected by a network 50 such as an IP network.

The image forming apparatus 100 may be implemented by an MFP or a printer, for example. The image forming apparatus 100 performs an image forming process in response to a job execution request from an external device, such as the smart device 200, that requests the execution of an image forming process such as printing, scanning, or facsimile transmission, for example.

The smart device 200 may be implemented by an information processing apparatus, such as a smartphone or a tablet terminal, for example. The smart device 200 is directly connected to the image forming apparatus 100 and is configured to send a print request to the image forming apparatus 100 based on attributes such as the resolution of a display image of a display screen of a web page that is viewed using an app of the smart device 200 and print conditions to be implemented by the image forming apparatus 100 upon printing such a display image. Specifically, the smart device 200 determines whether a printed image of the display image in the display screen of the web page to be printed by the image forming apparatus 100 in response to a print request from the smart device 200 would be too rough and grainy, and if the smart device 200 determines that the printed image would be too rough and grainy, the smart device 200 searches for another display image (substitute image) on another display screen of another web page that is associated with the above web page. If the other display screen includes another display image similar to the display image but in a different size, the smart device 200 determines whether a printed image of the other display image to be printed by the image forming apparatus 100 in response to a print request would be too rough and grainy. If it is determined that the printed image of the other display image would not be too rough and grainy, the smart device 200 transmits image data of the other display image instead of image data of the display image initially displayed on the display screen to the image forming apparatus 100, and requests the image forming apparatus 100 to perform a printing process based on the image data.

<Image Forming Apparatus 100>

Figure 2:
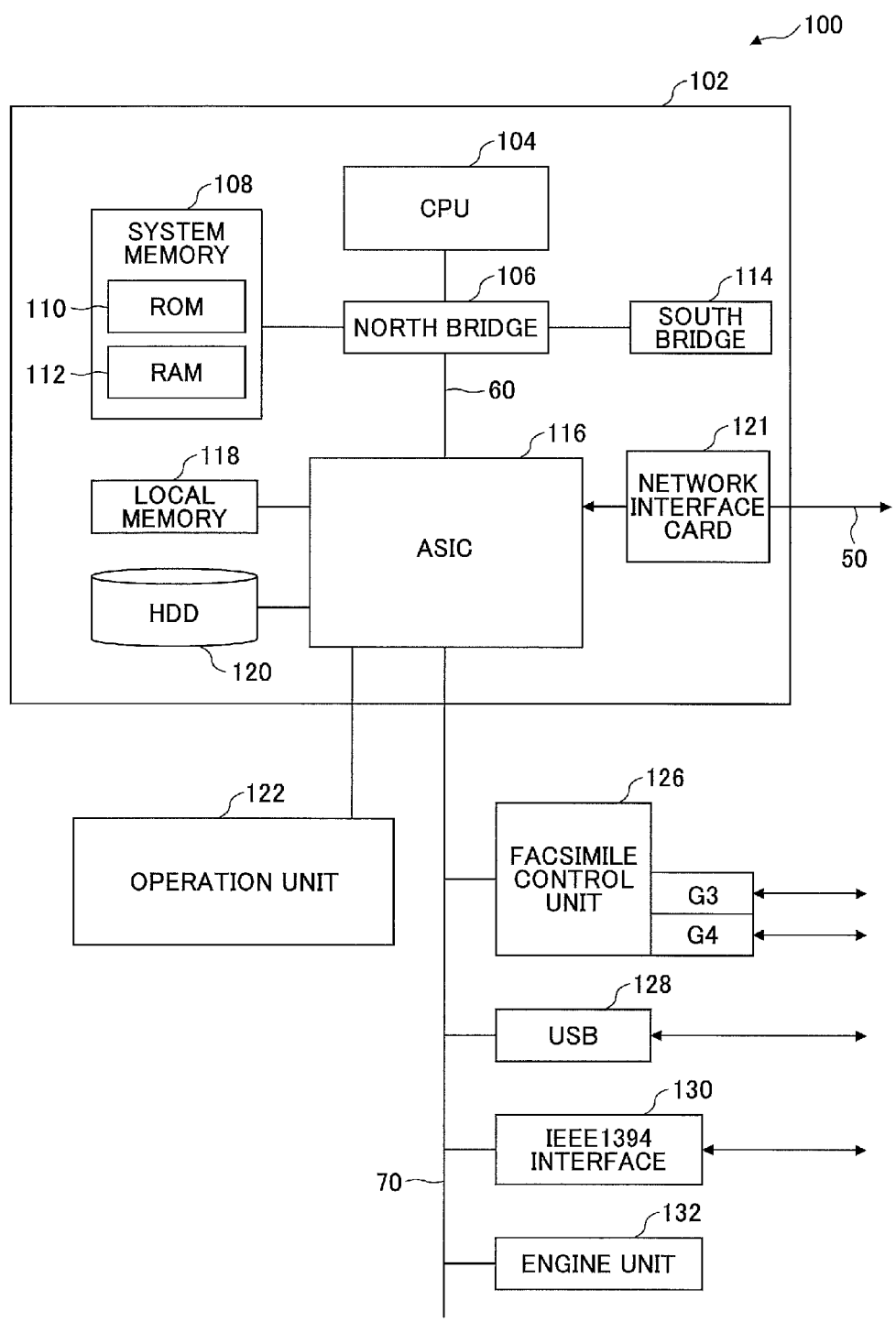
FIG. 2 is a block diagram showing an example hardware configuration of an image forming apparatus according to an embodiment of the present invention.

FIG. 2 shows an example hardware configuration of the image forming apparatus 100 according to the present embodiment.

The image forming apparatus 100 includes a controller 102, an operation unit 122, a facsimile control unit (FCU) 126, a USB (Universal Serial Bus) 128, an IEEE (Institute of Electrical and Electronic Engineers) 1394 interface 130, and an engine unit 132.

The controller 102 includes a CPU (Central Processing Unit) 104, a northbridge (NB) 106, a system memory (MEM-P) 108, a southbridge (SB) 114, an ASIC (application specific integrated circuit) 116, a local memory (MEM-C) 118, a HDD 120, and a network interface card (NIC) 121. The system memory 108 includes a ROM (Read Only Memory) 110 and a RAM (Random Access Memory) 112.

The CPU 104 performs overall control of the image forming apparatus 100 and configures a chip set in conjunction with the northbridge 106, the system memory 108, and the southbridge 114. The CPU 104 is connected to another device via the chip set. The northbridge 106 is a bridge that establishes connection between the CPU 104 and the system memory 108, the southbridge 114, and an AGP (Accelerated Graphics Port) bus 60. The northbridge 106 includes a memory controller that controls read/write operations with respect to the system memory 108, a PCI (Peripheral Component Interface) master, and an AGP target.

The AGP bus 60 is a bus interface for a graphics accelerator card that has been proposed to speed up graphic processing. The AGP bus 60 accelerates the graphics accelerator card by directly accessing the system memory 108 at a high throughput.

The ROM 110 of the system memory 108 is a dedicated read-only memory for storing programs and data for the image forming apparatus 100. The RAM 112 of the system memory 108 is used for loading the programs and data for the image forming apparatus 100 and is also used as a readable/writable memory when a drawing process is performed by a printer. The southbridge 114 is a bridge that establishes connection between the northbridge 106 and a peripheral device such as a PCI device. The southbridge 114 is connected to the northbridge 106 via a PCI bus, and a network interface (I/F) and the like may be connected to the PCI bus.

The ASIC 116 is an IC (Integrated Circuit) for image processing including a hardware element for image processing. The ASIC 116 acts as a bridge for connecting with the AGP bus 60, a PCI bus 70, the HDD 120, and the local memory 118. The ASIC 116 includes a PCI target, an AGP master, an arbiter (ARB) of the ASIC 116, a memory controller that controls the local memory 118, a plurality of DMACs (Direct Memory Access Controllers) that perform operations such as image data rotation based on hardware logic, and a PCI unit that transfers data to an engine unit 132 via the PCI bus 70. The ASIC 116 is connected to an operation unit 122, a facsimile control unit 126, a USB 128, an IEEE 1394 interface 130, and the engine unit 132 via the PCI bus 70.

The local memory 118 is used as a copy image buffer and a code buffer. The HDD 120 stores image data, programs, font data, and forms. Further, the HDD 120 stores a license file of an application executed by the image forming apparatus 100. The NIC 121 is an interface connected to the network 50.

The operation unit 122 is directly connected to the ASIC 116 and acts as an interface for an operator that performs operations on the image forming apparatus 100. By operating the operation unit 122, the operator may perform operations such as data input, job execution, and data display, for example.

The facsimile control unit 126 is connected to the PCI bus 70 and controls communication with an external apparatus such as a fax machine or a copying apparatus having a modem function via a public network. The USB 128 and the IEEE 1394 interface 130 are connected to the PCI bus 70 and can be connected to peripheral devices. The engine unit 132 is connected to the PCI bus 70 and is capable of implementing a printer engine such as a black & white plotter, a one-drum color plotter, a four-drum color plotter, a scanner, and/or a fax unit, for example. Note that in some embodiments, the engine unit 132 may also include an image processing unit for implementing error diffusion and/or gamma conversion, for example.

<Smart Device 200>

Figure 3:
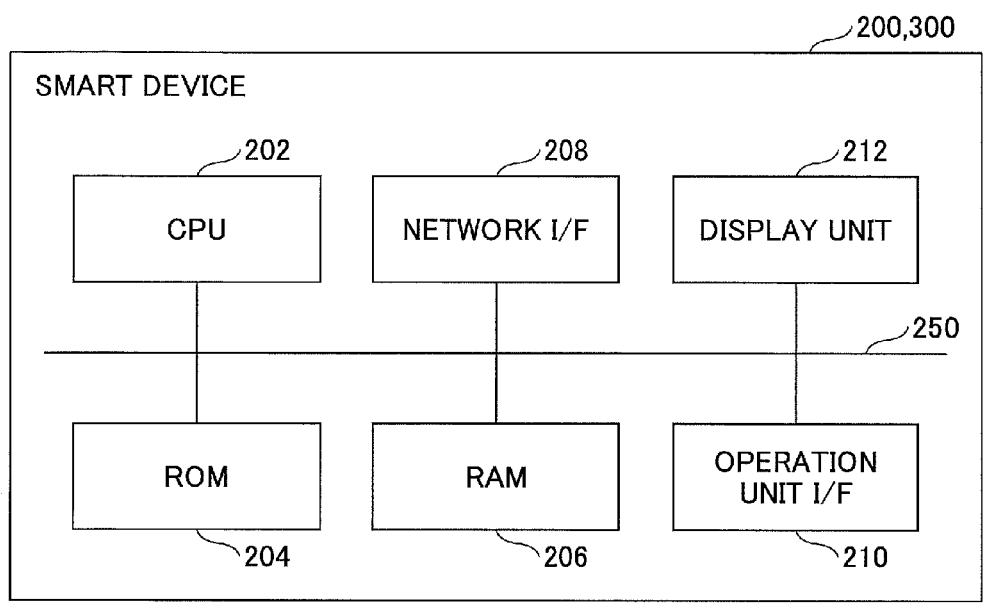
FIG. 3 is a block diagram showing an example hardware configuration of a smart device according to an embodiment of the present invention.

FIG. 3 shows an example hardware configuration of a smart device 200 according to the present embodiment.

In FIG. 3, the smart device 200 includes a CPU 202 that controls the overall operation of the smart device 200 and a ROM 204 that stores a smart device program for driving the CPU 202 and various data such as transmission data. The smart device 200 also includes a RAM 206 that is used as a program execution area, a network I/F 208 for transmitting data using the network 50, an operation unit I/F 210 for operating the smart device 200, and a display unit 212 for displaying a variety of information according to a program that is executed. The CPU 202, the ROM 204, the RAM 206, the network I/F 208, the operation unit I/F 210, and the display unit 212 are connected by a bus 250. The smart device program may be stored in a computer-readable recording medium as a file in an installable format or an executable format and distributed in such a state, for example.

<Functional Configuration>

Figure 4:
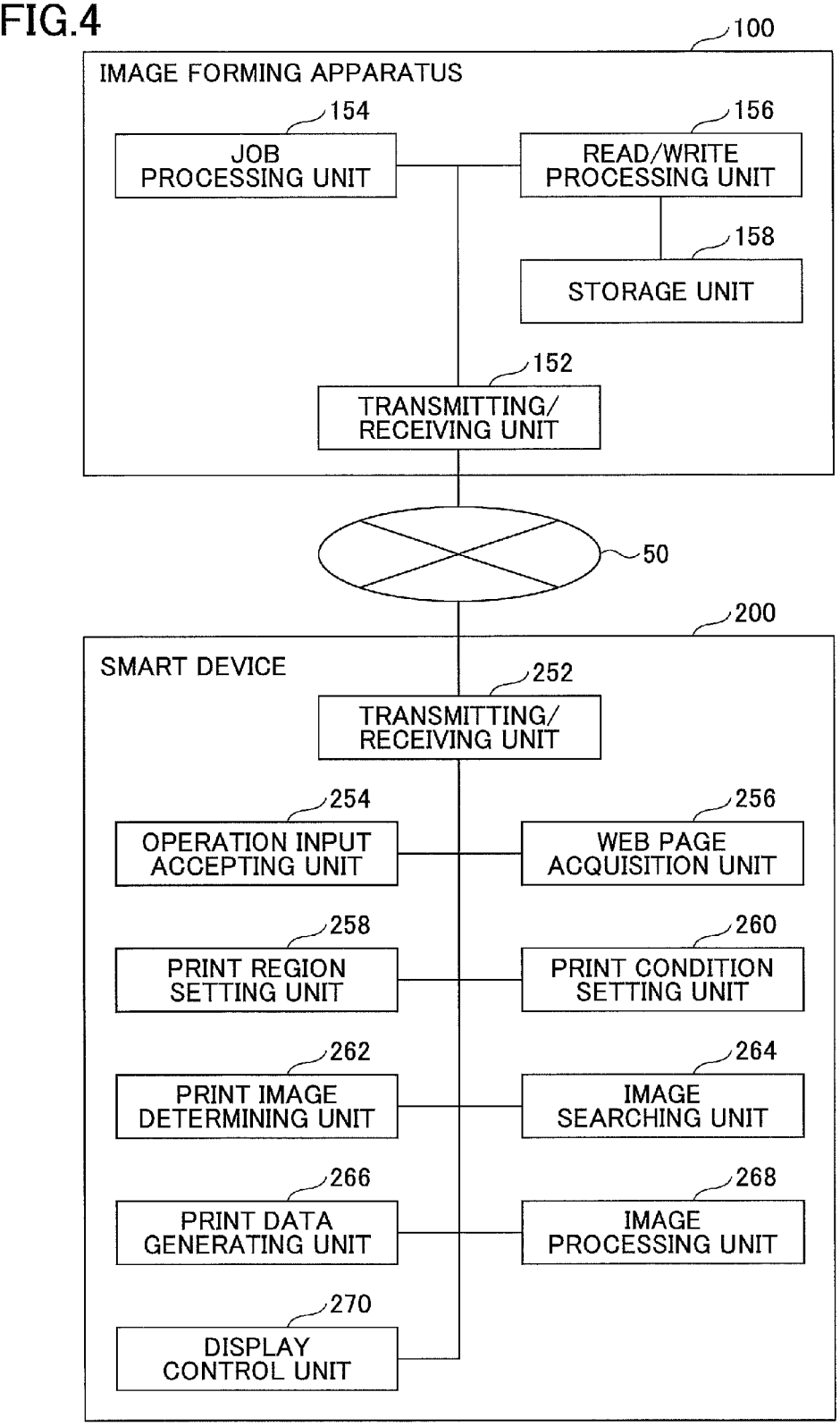
FIG. 4 is a block diagram showing an example functional configuration of the image forming system according to an embodiment of the present invention.

In the following, a functional configuration of the image processing system according to the present embodiment is described. FIG. 4 is a block diagram showing a functional configuration of the image forming system according to the present embodiment.

<Image Forming Apparatus 100>

The image forming apparatus 100 includes a transmitting/receiving unit 152, a job processing unit 154, and a read/write processing unit 156. These functional units may be implemented by one or more of the hardware components shown in FIG. 2 operating under control by the CPU 104 based on an image forming apparatus program stored in the HDD 120, for example. Further, the image forming apparatus 100 includes a storage unit 158 that may be implemented by the HDD 120 shown in FIG. 2, for example.

<Image Forming Apparatus 100 Functional Units>

In the following, the functional units of the image forming apparatus 100 are described in detail.

The transmitting/receiving unit 152 of the image forming apparatus 100 is implemented by the network interface card 121 and an instruction from the CPU 104 shown in FIG. 2. The transmitting/receiving unit 152 transmits/receives various data (information) to/from the smart device 200 via the network 50.

The job processing unit 154 of the image forming apparatus 100 is implemented by an instruction from the CPU 104 and the engine unit 132 shown in FIG. 2. When a job designated in a job execution request from the smart device 200 is input to the job processing unit 154 via the transmitting/receiving unit 152, the job processing unit 154 processes the job.

The read/write processing unit 156 of the image forming apparatus 100 is implemented by an instruction from the CPU 104 and an image forming apparatus program stored in the HDD 120 shown in FIG. 2. The read/write processing unit 156 performs processes such as storing (writing) various data in the storage unit 158 and reading various data stored in the storage unit 158.

<Smart Device 200>

The smart device 200 includes a transmitting/receiving unit 252, an operation input accepting unit 254, a web page acquisition unit 256, a print region setting unit 258, a print condition setting unit 260, a print image determining unit 262, an image searching unit 264, a print data generating unit 266, an image processing unit 268, and a display control unit 270. These functional units may be implemented by one or more of the hardware components shown in FIG. 3 operating under control of the CPU 202 based on a smart device program stored in the ROM 204, for example.

<Smart Device 200 Functional Units>

In the following, the functional units of the smart device 200 are described in detail.

The transmitting/receiving unit 252 of the smart device 200 is implemented by an instruction from the CPU 202 and the network I/F 208 shown in FIG. 3. The transmitting/receiving unit 252 transmits/receives various data (information) to/from the image forming apparatus 100. Note that the transmitting/receiving unit 252 may transmit/receive the various data (information) to/from the image forming apparatus 100 wirelessly or by wire.

The operation input accepting unit 254 of the smart device 200 is implemented by an instruction from the CPU 202 and the operation unit I/F 210 shown in FIG. 3. The operation input accepting unit 254 accepts various operation inputs from a user. For example, the user may operate the operation unit I/F 210 of FIG. 3 to display a web page by designating a URL. In such case, the operation input accepting unit 254 of FIG. 4 may accept the user operation and input web page acquisition information to the web page acquisition unit 256. Also, the user may operate the operation unit I/F 210 of FIG. 3 to designate a print region of the web page displayed by the display unit 212 including characters and/or a display image, for example. In such a case, the operation input accepting unit 254 of FIG. 4 may accept the user operation and input print region information to the print region setting unit 258. Further, the user may operate the operation unit I/F 210 of FIG. 3 to designate print conditions for printing the web page displayed on the display unit 212, for example. In such a case the operation input accepting unit 254 of FIG. 4 may accept the user operation and input the print conditions to the print condition setting unit 260.

The web page acquisition unit 256 of the smart device 200 is implemented by an instruction from the CPU 202 shown in FIG. 3. The web page acquisition unit 256 acquires a web page based on the web page acquisition information input by the operation input accepting unit 254 and inputs the acquired web page to the display control unit 270. The display control unit 270 of the smart device 200 is implemented by an instruction from the CPU 202 and the display unit 212 shown in FIG. 3. The display control unit 270 performs control operations to display the web page acquired by the web page acquisition unit 256 on the display unit 212.

Figure 5:
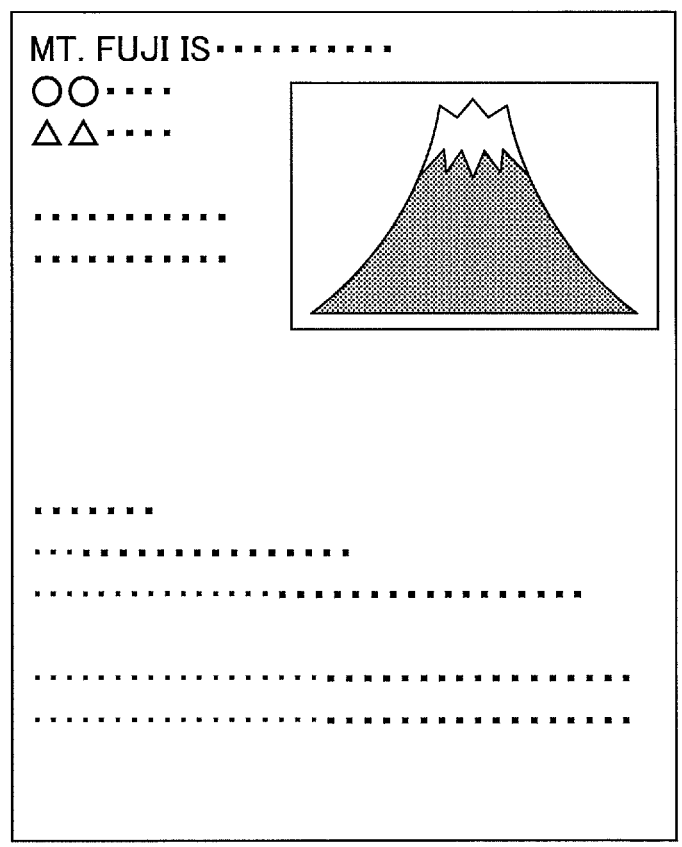
FIG. 5 is a diagram showing an example of a web page.

FIG. 5 shows an example of a web page displayed on the display unit 212. The web page shown in FIG. 5 includes characters and a display image.

The print region setting unit 258 of the smart device 200 is implemented by an instruction from the CPU 202 shown in FIG. 3. The print region setting unit 258 generates print region setting information by setting a print region within the web page displayed on the display unit 212 based on the print region information input by the operation input accepting unit 254, and inputs the generated print region setting information to the print image determining unit 262. Note that in a case where the print region setting unit 258 determines, based on the print region information, that there is a display image near text (characters) that is included in the print region designated by the user, the print region setting unit 258 may generate print region setting information including image information of the display image, for example. Also, in a case where the print region setting unit 258 determines, based on the print region information, that there is text (characters) near a display image included in the print region designated by the user, the print region setting unit 258 may generate print region setting information including character information of text (characters). That is, the print region setting information may include one or both of image information of a display image and character information of characters (text).

Figure 6:
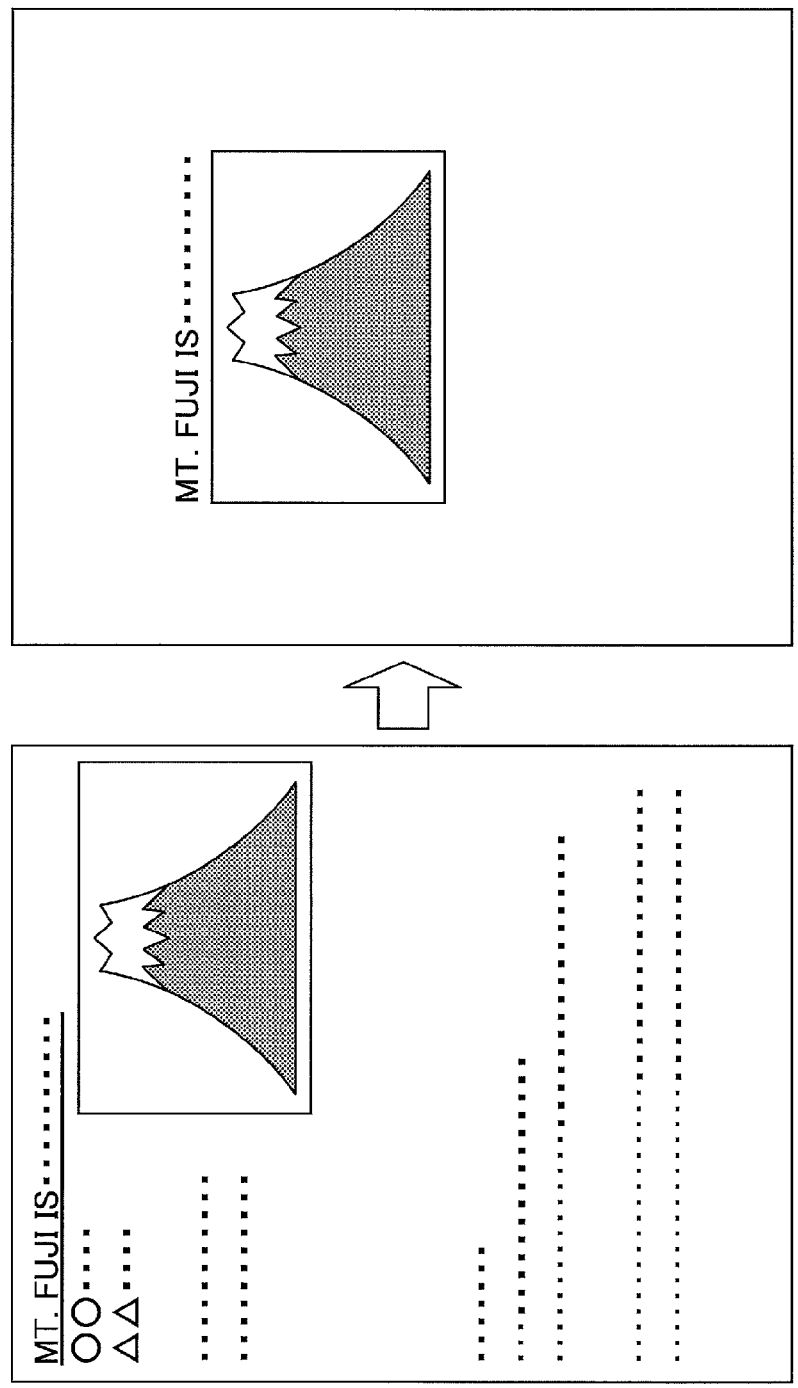
FIG. 6 is a diagram showing an example of a print region.

FIG. 6 shows an example of a print region. The user designates a print region within a web page displayed on the display unit 212 by operating the operation unit I/F 210. For example, as shown in the left side diagram of FIG. 6, the user may operate the operation unit I/F 210 to select text (characters) to be printed by underlining the desired text within the web page. Note that a pointing device may be used to select the text to be printed, for example. In response to such an operation, the print region setting unit 258 generates print region setting information as illustrated in the right side diagram of FIG. 6, for example, including character information of the text selected by the operation unit I/F 210 and image information of a display image near the selected text. Specifically, the print region setting unit 258 searches for a display image near the selected text by detecting a display image displayed within a predetermined range from the selected text. The image information of the display image may be in the bitmap file format or the JPEG (Joint Photographic Experts Group) format, for example.

The print condition setting unit 260 of the smart device 200 is implemented by an instruction from the CPU 202 shown in FIG. 3. The print condition setting unit 260 sets the print conditions input by the operation input accepting unit 254 and inputs the set print conditions to the print image determining unit 262.

Figures 7, 8, 9:
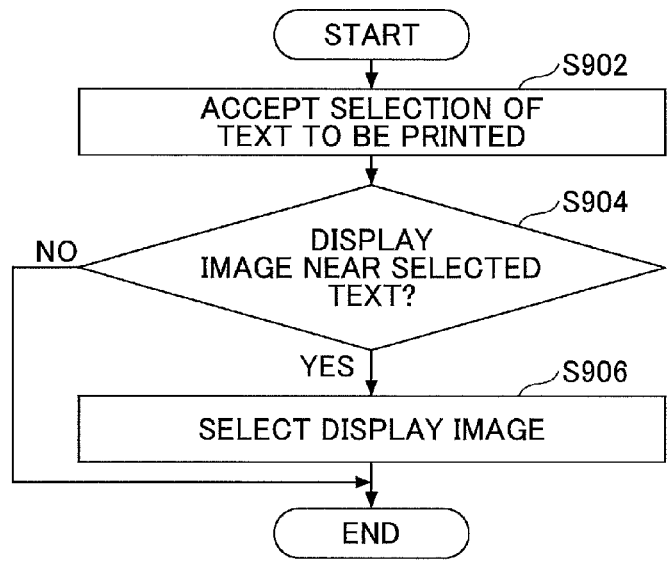
FIG. 7 is a diagram showing an example of print condition settings.
FIG. 8 is a diagram showing an example format of image information of a display image.
FIG. 9 is a flowchart showing a first operation of the image forming system according to an embodiment of the present invention.

FIG. 7 shows an example of print condition settings. In the present example, the print conditions include the document size, the print resolution, and the output paper size. The document size and the output paper size may be specified by a standard paper size such as A3, A4, etc. The print resolution may be specified by an image detail such dpi. By specifying the document size and the output paper size, print conditions may be set up regarding whether to enlarge an image included in a web page. In the print conditions of FIG. 7, the document size is A4 and the output paper size is A3; that is, the output paper size is larger than the document size, and therefore, the image will be enlarged upon being printed. Also, by including the print resolution in the print conditions, it can be determined whether the printed image may be too rough and grainy in view of the pixel density of the display unit 212 of the smart device 200. For example, if the pixel density of the display unit 212 is 200 dpi and the image is printed at a print resolution of 600 dpi, the printed image may appear too rough and grainy.

The print image determining unit 262 of the smart device 200 is implemented by an instruction from the CPU 202 shown in FIG. 3. The print image determining unit 262 determines, based on the print region setting information input by the print region setting unit 258, whether the print region setting information includes image information. If the print region setting information includes image information, the print image determining unit 262 determines, based on the image information and the print conditions input by the print condition setting unit 260, whether a printed image to be printed by the image forming apparatus 100 would be too rough and grainy. If the print image determining unit 262 determines that the print region setting information does not include image information, or if the print image determining unit 262 determines that the print region setting information includes image information, but that the printed image to be printed by the image forming apparatus 100 would not be too rough and grainy, the print image determining unit 262 inputs the print region setting information to the print data generating unit 266.

On the other hand, if the print image determining unit 262 determines that image information is included in the printing region setting information and a printed image to be printed by the image forming apparatus 100 would be too rough and grainy, the print image determining unit 262 inputs a display image search request to the image searching unit 264 to request a search for another display image (substitute image) similar to the display image but in a different size (e.g., different resolution). If other image information of another display image similar to the display image but in a different size is input to the print image determining unit 262 from the image searching unit 264 in response to the display image search request, the print image determining unit 262 determines, based on the other image information and the print conditions set by the print condition setting unit 260, whether a printed image of the other display image to be printed by the image forming apparatus 100 would be too rough and grainy. If the print image determining unit 262 determines that the printed image would not be too rough and grainy, the print image determining unit 262 inputs print region setting information including the other image information of the other display image instead of the image information of the display image to the print data generating unit 266.

On the other hand, if the print image determining unit 262 receives notification from the image searching unit 264 that another display image could not be found in response to the display image search request, or even if another display image is found, the print image determining unit 262 determines that the printed image of the other display image to be printed by the image forming apparatus 100 would be too rough and grainy, the print image determining unit 262 inputs a super-resolution process request to the image processing unit 268 to request execution of a super-resolution process to improve the image quality of the display image. When image information of a super-resolution processed image of the display image is input to the print image determining unit 262 from the image processing unit 268 in response to the super-resolution process request, the print image determining unit 262 inputs print region setting information including the image information of the super-resolution processed image instead of the image information of the display image to the print data generating unit 266.

FIG. 8 shows an example format of the image information of the display image. The image information includes an identifier of the display image, the size of the display image, the width of the display image (pixels), the height of the display image (pixels), and other image information of the display image. The image information may also include information indicating the image detail of the display image such as such the resolution (dpi) of the display image, for example.

In specifying the size of the display image based on the width of the display image and the height of the display image, an html (HyperText Markup Language) tag (1) for displaying the display image as shown below may be used, for example.

$$<\text{img scr="URL(Display Image Address)"} \\ \text{width="Display Image Width" height="Display} \\ \text{Image Height"} \tag{1}$$

The above html tag (1) is an example of an html tag specifying a display image size using html code. By specifying a width and a height for a display image specified by an address, the size of the display image to be displayed on the web page may be specified. Note that if a width and a height that are greater than the display image width (pixels) and the display image height (pixels) are specified in html, the display image may be grainy and rough even when displayed on the web page.

The print image determining unit 262 determines, based on the image information and the print conditions, whether a printed image to be printed by the image forming apparatus 100 in response to a print request would be too grainy and rough using the formula (2) below.

$$\frac{\text{Display } ImageDensity \text{ (dpi)} \times ImageFileWidth \text{ (pixels)} \times DocumentSizeWidth \text{(mm)}}{\text{Print } Resolution \text{ (dpi)} \times html\ ImageWidth \text{(pixels)} \times OutputPaperSizeWidth \text{ (mm)}} \geq 1 \tag{2}$$

The above formula (2) is an example formula used for determining whether the width of the display image is appropriate in view of the print conditions. If the calculated result of the left side of the above formula (2) is greater than or equal to 1, this means that the image quality of the printed image is at least equal to the image quality of the display image displayed on the display unit 212 of the smart device 200. Using the above formula (2), the print image determining unit 262 determines, based on the width of the display image, whether the printed image would be too rough and grainy. The print image determining unit 262 also determines, based on the height of the display image, whether the printed image would be too rough and grainy. Note that in the case of making the above determination with respect to the height of the display image, a formula replacing the term "width" of the above formula (2) with "height" may be used, for example.

The image searching unit 264 of the smart device 200 is implemented by an instruction from the CPU 202 and the network I/F 208 shown in FIG. 3. When a display image search request is input to the image searching unit 264 from the print image determining unit 262, the image searching unit 264 searches for another display image similar (or identical) to the display image but in a different size (e.g., different resolution). The image searching unit 264 determines whether a display image is similar (or identical) to the display image based on a feature value of the image. If the image searching unit 264 finds a new display image (another display image) in a different size in response to the display image search request, the image searching unit 264 inputs image information of the new display image (substitute display image) in the different size to the print image determining unit 262. When the image searching unit 264 is unable to find a new display image in a different size, the image searching unit 264 notifies the print image determining unit 262 that a new display image could not be found.

The print data generating unit 266 of the smart device 200 is implemented by an instruction from the CPU 202 shown in FIG. 3. The print data generating unit 266 generates print data to be transmitted to the image forming apparatus 100 based on the print region setting information input by the print image determining unit 262, and transmits the generated print data to the image forming apparatus 100 via the transmitting/receiving unit 252.

The image processing unit 268 of the smart device 200 is implemented by an instruction from the CPU 202 shown in FIG. 3. The image processing unit 268 generates new image information by performing a super-resolution process that may involve reconfiguring the image information of the display image in response to a super-resolution process request input by the print image determining unit 262, for example. The image processing unit 268 then inputs image information of the super-resolution processed image to the print image determining unit 262.

The display control unit 270 of the smart device 200 is implemented by an instruction from the CPU 202 and the display unit 212 shown in FIG. 3. The display control unit 270 controls an operation of displaying a web page input by the web page acquisition unit 256.

<Image Forming System Operation>

FIG. 9 shows a first operation of the image forming system according to the present embodiment. FIG. 9 shows a process for determining whether there is a display image near text to be printed that has been selected by a user from a web page displayed by the smart device 200. Note that the process of FIG. 9 is performed after the user operates the operation unit I/F 210 to display a web page on the display unit 212.

In step S902, the user of the smart device 200 selects text to be printed by operating the operation unit I/F 210, and the operation input accepting unit 254 accepts such user operation. The operation input accepting unit 254 then inputs print region information to the print region setting unit 258.

In step S904, the print region setting unit 258 of the smart device 200 determines whether there is a display image near the text selected by the user based on the print region information input by the operation input accepting unit 254. For example, the print region setting unit 258 may determine whether there is a display image near the selected text by determining whether an html tag "<scr img=" indicating that an image is included within a predetermined number of bytes from the "body" of an html tag describing the text selected in step S902. In the present example, it is assumed that the predetermined number of bytes is set in advance.

If it is determined that there is a display image near the print region designated by the user, the process proceeds to step S906. In step S906, the print region setting unit 258 generates print region setting information including image information of the display image. That is, if there is an html tag "<src img=" within a predetermined number of bytes from the "body" of the html tag describing the text selected in step S902, the print region setting unit 258 determines that there is a display image near the selected text.

On the other hand, if there is no display image near the print region designated by the user; i.e., if there is no html tag "<src img=" within a predetermined number of bytes from the "body" of the html tag describing the text selected in step S902, the process is terminated.

Figure 10:
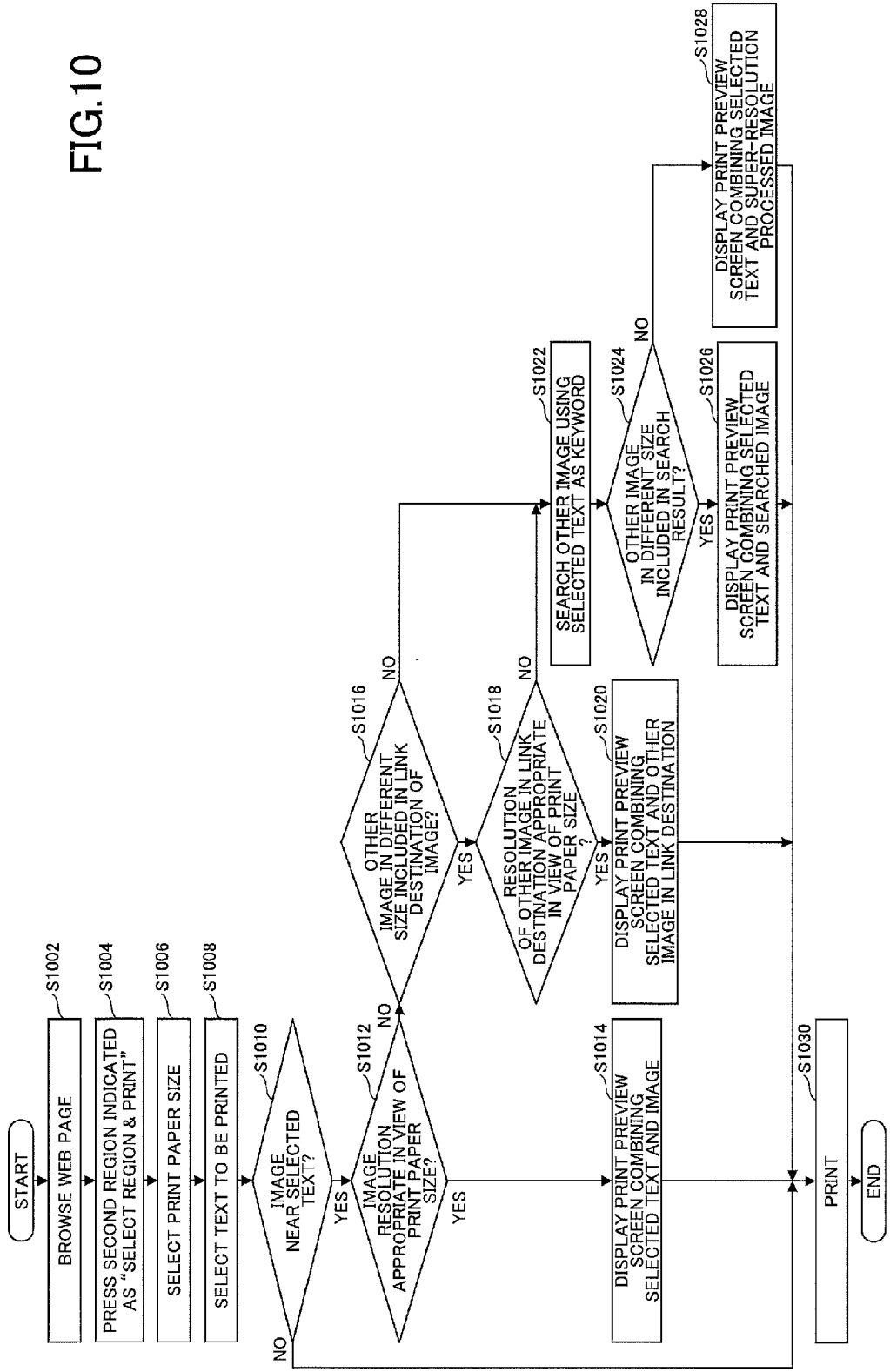
FIG. 10 is a flowchart showing a second operation of the image forming system according to an embodiment of the present invention.

FIG. 10 shows a second operation of the image forming system according to the present embodiment. FIG. 10 shows a process implemented in a case where text to be printed is selected by the user of the smart device 200. Note that the process of FIG. 10 is performed after the user operates the operation unit I/F 210 to display a web page on the display unit 212.

In step S1002, a web page is displayed on the display unit 212 of the smart device 200, and the user browses the web page.

Figure 11:
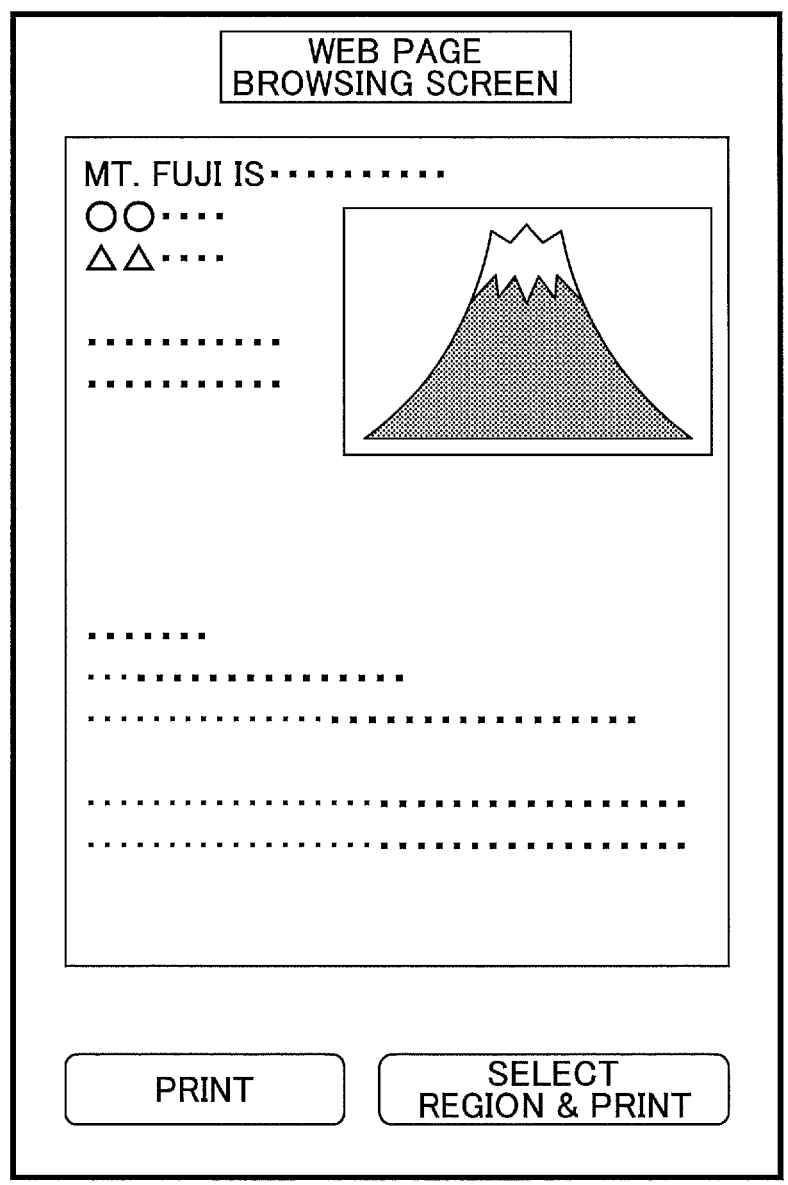
FIG. 11 is a diagram showing an example of a web page browsing screen.

FIG. 11 shows an example of a web page browsing screen displayed on the display unit 212. In addition to displaying the web page, the web page browsing screen displays a first region indicated as "print" to be pressed when printing the entire web page, and a second region indicated as "select region & print" to be pressed when selecting a specific print region to be printed and printing the selected print region.

In step S1004, the user of the smart device 200 presses the second region indicated as "select region & print". When the second region within the web page browsing screen is pressed, the operation input accepting unit 254 inputs print region information to the print region setting unit 258.

In step S1006, the user of the smart device 200 operates the operation unit I/F 210 to select the print paper size (output paper size), and in turn, the operation input accepting unit 254 accepts the user operation and inputs print paper size selection information to the print condition setting unit 260.

In step S1008, the user of the smart device 200 operates the operation unit I/F 210 to select text to be printed, and the operation input accepting unit 254 accepts the user operation.

Figure 12:
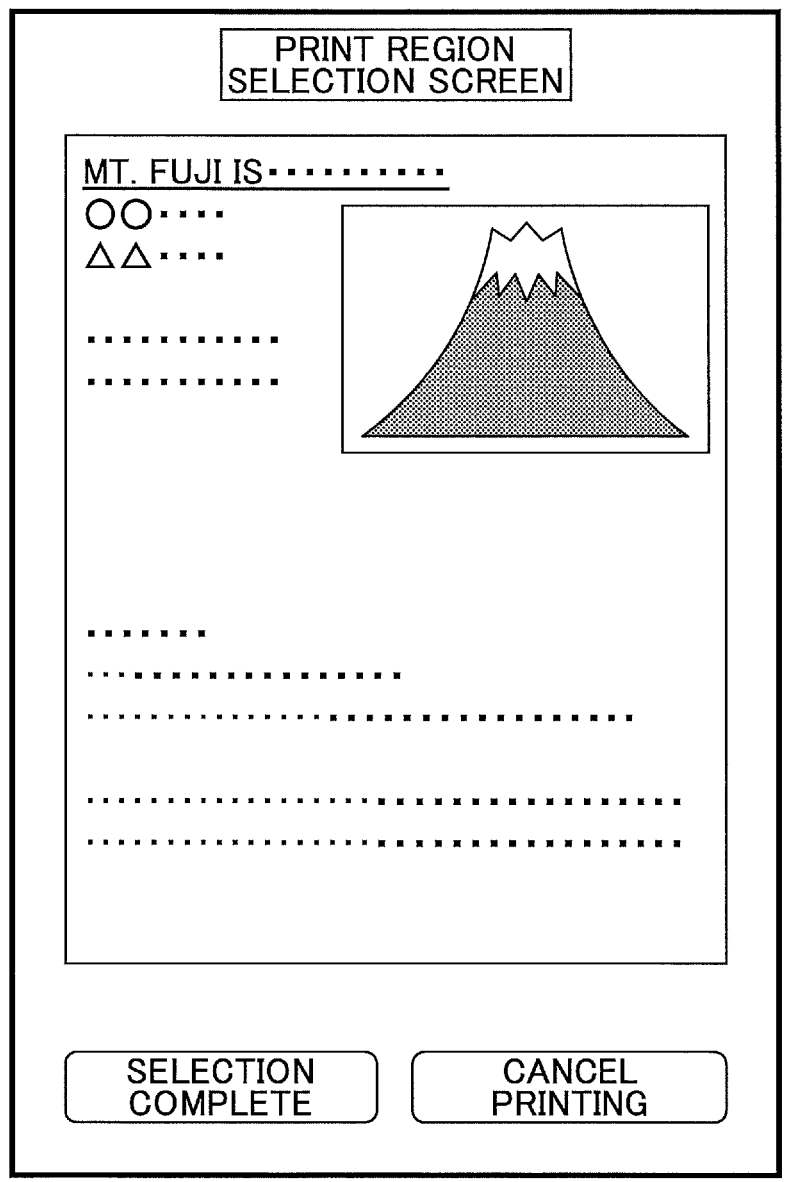
FIG. 12 is a diagram showing an example of a print region selection screen.

FIG. 12 shows an example of a print region selection screen displayed on the display unit 212. The print region selection screen may be displayed when the second region within the web page browsing screen is pressed. The print region selection screen that is displayed includes a third region indicated as "selection complete" to be pressed when selection of a print region is completed, and a fourth region indicated as "cancel printing" to be pressed when canceling the printing operation. Note that the user of the smart device 200 may select a print region such as text to be printed by underlining the relevant text, for example. The operation input accepting unit 254 then inputs print region information to the print region setting unit 258. In the present example, it is assumed that the print region information includes text.

In step S1010, the print region setting unit 258 of the smart device 200 determines whether there is a display image near the print region designated by the user based on the print region information input by the operation input accepting unit 254.

If it is determined that there is a display image near the print region designated by the user, the process proceeds to step S1012. In step S1012, the print region setting unit 258 generates print region setting information including image information of the display image and inputs the generated print region setting information to the print image determining unit 262. In turn, the print image determining unit 262 determines whether the resolution of the display image included in the print region setting information is appropriate in view of the selected print paper size. That is, the print image determining unit 262 uses the image information of the display image and the print conditions to be implemented by the image forming apparatus 100 upon printing the display image to determine whether a printed image of the display image to be printed by the image forming apparatus 100 would be too rough and grainy based on the above formula (2).

If it is determined that the resolution of the display image is appropriate in view or the print paper size, the process proceeds to step S1014. In step S1014, the print image determining unit 262 directs the display control unit 270 to display a print preview screen including the selected text and the display image displayed near the selected text.

Figure 13:
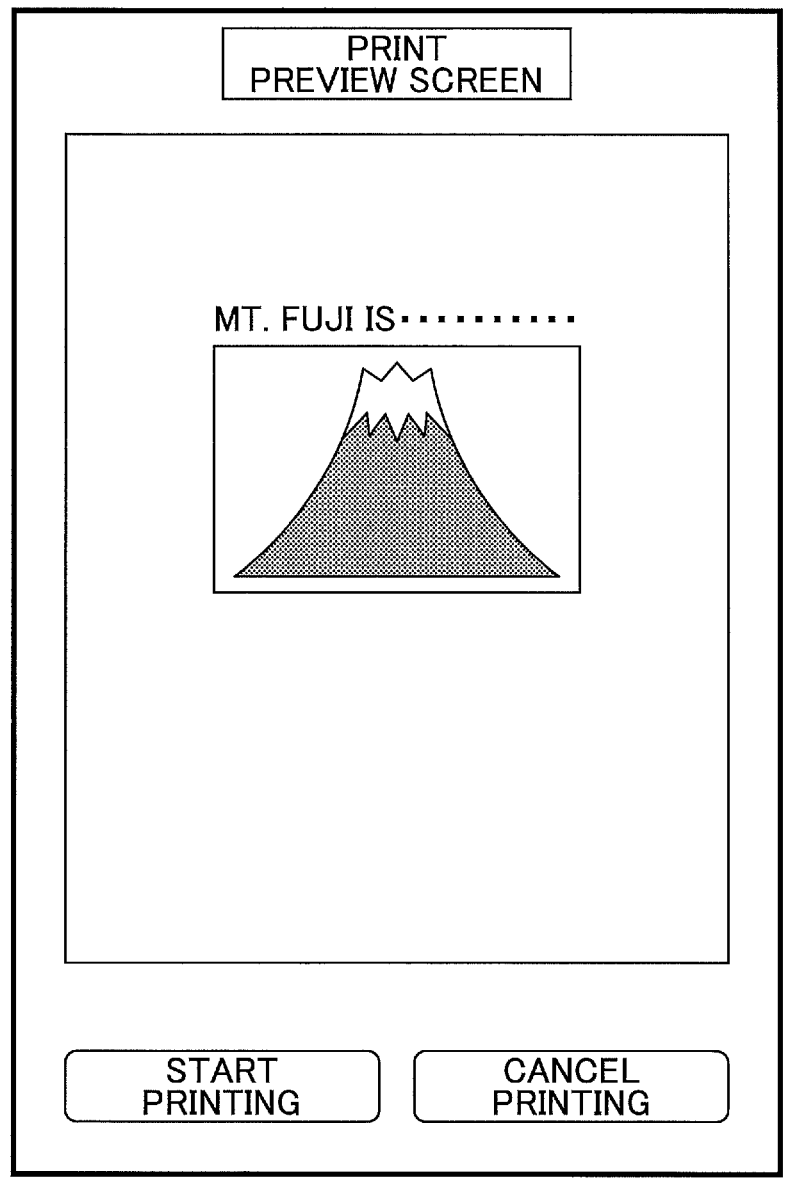
FIG. 13 is a diagram showing an example of a print preview screen.

FIG. 13 shows an example of a print preview screen displayed on the display unit 212 of the smart device 200. The print preview screen of FIG. 13 displays the selected text and the display image displayed near the selected text. The print preview screen also includes a fourth region indicated as "cancel printing" to be pressed when canceling the printing operation, and a fifth region indicated as "start printing" to be pressed when starting the printing operation.

If it is determined that the resolution of the display image is not appropriate in view of the print paper size, the process proceeds to step S1016. In step S1016, the image searching unit 264 of the smart device 200 determines whether there is another display image that is similar to the display image of the web page but in a different size by searching a link destination of the display image of the web page.

If it is determined that there is another display image (substitute image) similar to the display image of the web page but in a different size (e.g., different resolution) in the link destination of the display image of the web page, the process proceeds to step 1018. In step S1018, the print image determining unit 262 determines whether the resolution of the other display image is appropriate in view of the print paper size. That is, the print image determining unit 262 uses the image information of the other display image and the print conditions to determine whether a printed image of the other display image to be printed by the image forming apparatus 100 would be too rough and grainy based on the above formula (2).

If it is determined that the resolution of the other display image is appropriate in view of the print paper size, the process proceeds to step S1020. In step S1020, the print image determining unit 262 directs the display control unit 270 to display a print preview screen including the selected text and the other display image. Note that the format of the print preview screen displayed in step S1020 may identical to that of the print preview screen shown in FIG. 13, for example.

If it is determined in step S1016 that no substitute display image that is similar to the above display image, but in a different size, is provided at the link destination of the display image of the web page, or if it is determined in step S1018 that the resolution of the other display image is not appropriate in view of the print paper size, the process proceeds to step S1022. In step S1022, the image searching unit 264 searches for an image using the selected text as a keyword and inputs the search result to the print image determining unit 262.

In step S1024, the image searching unit 264 of the smart device 200 determines whether there is another display image that is similar to the above display image but in a different size in the search result input by the image searching unit 264.

If the search result indicates that a substitute display image of the web page is available, the process proceeds to step S1026. In step S1026, the print image determining unit 262 directs the display control unit 270 to display a print preview screen that includes the selected text and the other display image. Note that the format of the print preview screen displayed in step S1026 may be identical to that of the print preview screen of FIG. 13, for example.

If the search result indicates that no substitute display image similar to the display image of the web page is available, the process proceeds to step S1028. In step S1028, the print image determining unit 262 inputs the display image to the image processing unit 268 and requests the image processing unit 268 to execute a super-resolution process with respect to the display image. The print image determining unit 262 then directs the display control unit 270 to display a print preview screen that includes the selected text and the super-resolution processed display image. Note that the format of the print preview screen displayed in step S1028 may be identical to that of the print preview screen of FIG. 13, for example.

When the fifth region indicated as "start printing" in the print preview screen displayed in step S1014, S1020, S1026, or S1028 is pressed, the process proceeds to step S1030. In step S1030, the print data generating unit 266 generates print data to be transmitted to the image forming apparatus 100 based on the print region setting information input by the print image determining unit 262, and transmits the generated print data to the image forming apparatus 100 via the transmitting/receiving unit 252. In turn, the image forming apparatus 100 performs a printing process based on the print data received from the smart device 200.

Figure 14:
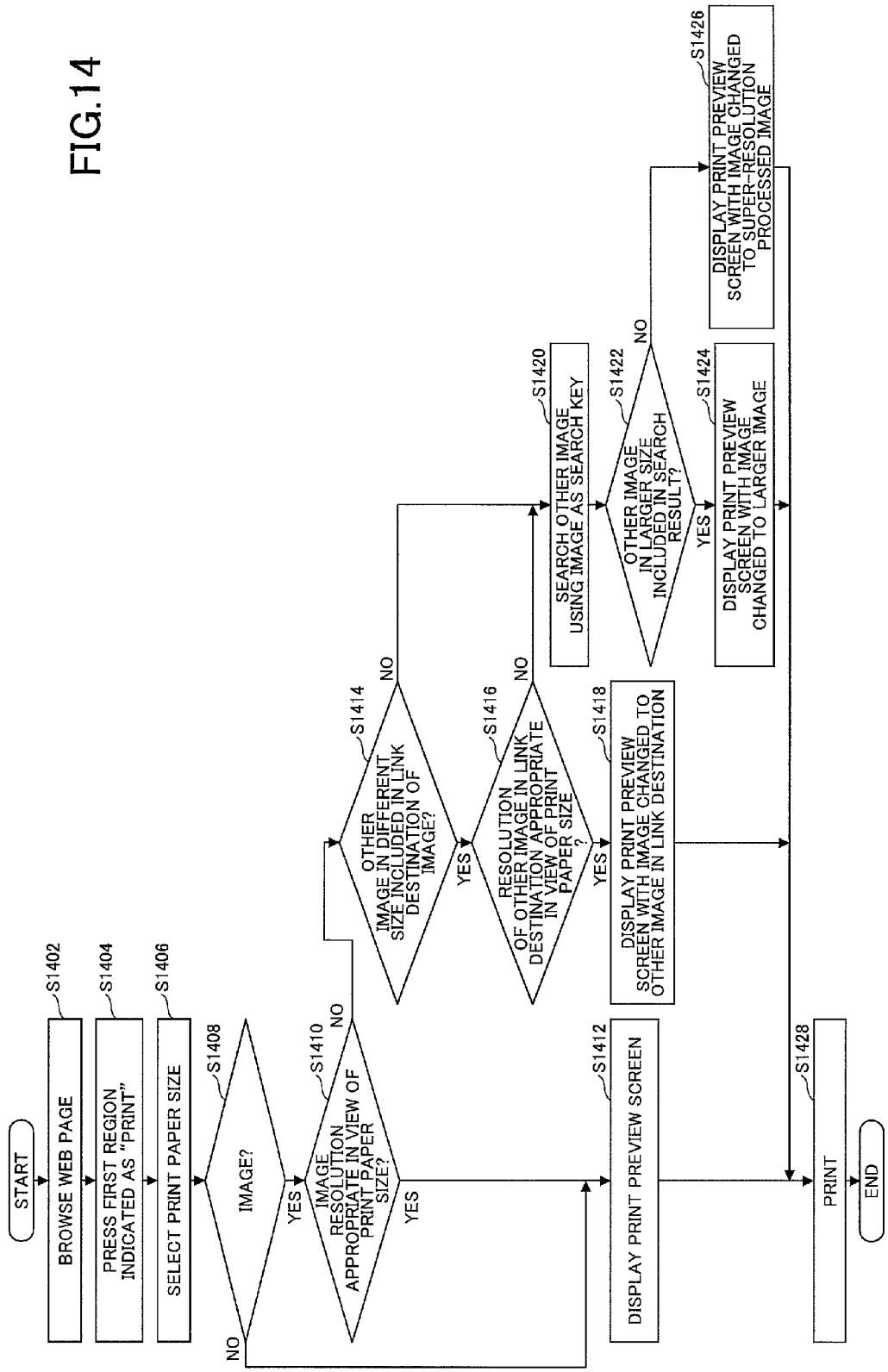
FIG. 14 is a flowchart showing a third operation of the image forming system according to an embodiment of the present invention.

FIG. 14 shows a third operation of the image forming system according to the present embodiment. The process of FIG. 14 is executed in a case where a document to be printed is selected by the user of the smart device 200. Note that FIG. 14 shows a process that is performed after the user operates the operation unit I/F 210 to display a web page on the display unit 212.

In step S1402, a web page is displayed on the display unit 212 of the smart device 200, and the user browses the web page.

In step S1404, the user of the smart device 200 presses the first region indicated as "print" in the web page browsing screen shown in FIG. 11. When the first region in the web page browsing screen is pressed, the operation input accepting unit 254 inputs print region information to the print region setting unit 258. In the present example, the print region information includes the entire web page document.

In step S1406, the user of the smart device 200 operates the operation unit I/F 210 to select a print paper size. In turn, the operation input accepting unit 254 accepts the user operation, and inputs print paper size selection information to the print condition setting unit 260.

In step S1408, the print region setting unit 258 of the smart device 200 determines whether there is a display image in the print region based on the print region information input by the operation input accepting unit 254.

If it is determined that there is a display image in the print region, the process proceeds to step S1410. In step S1410, the print region setting unit 258 generates print region setting information that includes image information of the display image, and inputs the generated print region setting information to the print image determining unit 262. The print image determining unit 262 then determines whether the resolution of the display image included in the print region setting information is appropriate in view of the print paper size. That is, the print image determining unit 262 uses the image information of the display image and the print conditions to determine whether a printed image to be printed by the image forming apparatus 100 would be too rough and grainy based on the above formula (2).

If the resolution of the display image is determined to be appropriate in view of the print paper size in step S1410, or if it is determined in step S1408 that there is no display image in the print region, the process proceeds to step S1412. In step S1412, the print image determining unit 262 directs the display control unit 270 to display a preview screen.

If the resolution of the display image is determined to be inappropriate in view of the print paper size in step S1410, the process proceeds to step S1414. In step S1414, the image searching unit 264 of the smart device 200 determines whether a substitute display image that is similar to the display image of the web page, but in a different size is available by searching a link destination of the display image of the web page.

If it is determined in step S1414 that a substitute display image similar to the display image of the web page, but in a different size, is provided at the link destination of the display image, the process proceeds to step S1416. In step S1416, the print image determining unit 262 determines whether the resolution of the substitute display image is appropriate in view of the print paper size. That is, the print image determining unit 262 uses the image information of the substitute display image and the print conditions to determine whether a printed image to be printed by the image forming apparatus 100 would be too rough and grainy based on the above formula (2).

If the resolution of the substitute display image is determined to be appropriate in view of the print paper size in step S1416, the process proceeds to step S1418. In step S1418, the print image determining unit 262 directs the display control unit 270 to display a print preview screen of the selected document that includes the substitute display image instead of the display image of the web page. Note that the format of the print preview screen displayed in step S1418 may be identical to that of the print preview screen of FIG. 13, for example.

If it is determined in step S1414 that no substitute display image similar to the display image of the web page, but in a different size, is provided at the link destination of the display image, or if it is determined in step S1416 that the resolution of the substitute display image is inappropriate in view of the print paper size, the process proceeds to step S1420. In step S1420, the image searching unit 264 searches for another display image (substitute image) using the display image of the web page as a search key.

In step S1422, the image searching unit 264 of the smart device 200 determines whether there is another display image that is similar to the display image of the web page but in a larger size.

If it is determined in step S1422 that no substitute display image similar to the display image of the web page is available, the process proceeds to step S1424. In step S1424, the print image determining unit 262 directs the display control unit 270 to display a print preview screen of the selected document including the other display image (larger display image) instead of the display image of the web page. Note that the format of the print preview screen displayed in step S1424 may be identical to that of the print preview screen of FIG. 13, for example. Further, the print image determining unit 262 inputs print region setting information including the selected document and image information of the other display image to the print data generating unit 216.

If it is determined in step S1422 that there is no other display image that is similar to the display image of the web page but in a larger size, the process proceeds to step S1426. In step S1426, the print image determining unit 262 inputs the display image of the web page to the image processing unit 268 and requests the image processing unit 268 to execute a super-resolution process on the display image. The print image determining unit 262 then directs the display control unit 270 to display a print preview screen of the selected document including the super-resolution processed display image. Note that the format of the print preview screen displayed in step S1426 may be identical to that of the print preview screen of FIG. 13, for example.

When the fifth region indicated as "start printing" in the print preview screen displayed in step S1412, S1418, S1424, or S1426 is pressed, the process proceeds to step S1428. In step S1428, the print data generating unit 216 generates print data to be transmitted to the image forming apparatus 100 based on the print region setting information input by the print image determining unit 262, and transmits the generated print data to the image forming apparatus 100 via the transmitting/receiving unit 252. In turn, the image forming apparatus 100 performs a printing process based on the print data received from the smart device 200.

According to an aspect of the present embodiment, when the resolution of a display image included in a web page being browsed is lower than the resolution specified by the print conditions to be implemented by the image forming apparatus 100 upon printing, a search may be conducted to determine whether there is another display image (substitute image) in a web page associated with the web page being browsed, and the display image may be replaced by the other display image (substitute image) upon printing a part or all of the web page being browsed. In this way, when printing the web page being browsed, the image quality of the printed display image may be improved, for example.

Second Embodiment

An image forming system according to a second embodiment of the present invention includes a smart device 300 in place of the smart device 200 according to the first embodiment. Note that the image forming system according to the present embodiment may have the system configuration as shown in FIG. 1, for example. The image forming apparatus 100 according to the present embodiment may have the hardware configuration as shown in FIG. 2, and the smart device 300 according to the present embodiment may have the hardware configuration as shown in FIG. 3, for example.

<Smart Device 300>

Figure 15:
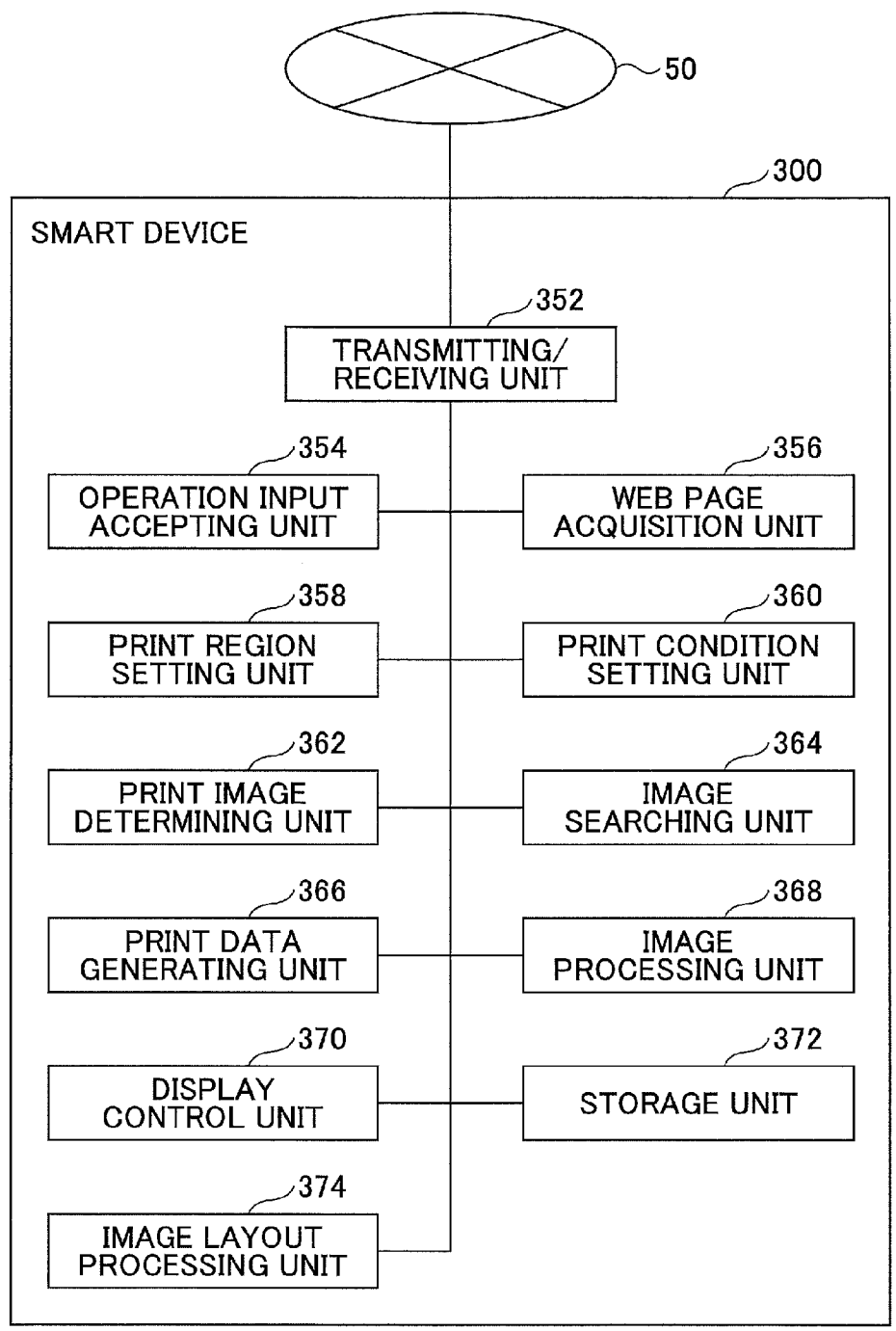
FIG. 15 is a block diagram showing another example functional configuration of a smart device according to an embodiment of the present invention.

FIG. 15 is a block diagram showing a functional configuration of the smart device 300. The smart device 300 includes a transmitting/receiving unit 352, an operation input accepting unit 354, a web page acquisition unit 356, a print region setting unit 358, a print condition setting unit 360, a print image determining unit 362, an image searching unit 364, a print data generating unit 366, an image processing unit 368, a display control unit 370, a storage unit 372, and an image layout processing unit 374. These functional units may be implemented by operating one or more of the hardware components shown in FIG. 3 under control by the CPU 202 based on a smart device program that is stored in the ROM 204, for example.

<Smart Device 300 Functional Units>

In the following, the functional units of the smart device 300 are described in detail.

Note that the transmitting/receiving unit 352, the operation input accepting unit 354, the web page acquisition unit 356, the print condition setting unit 360, the image searching unit 364, the print data generating unit 366, and the image processing unit 368 of the smart device 300 may be substantially identical to the transmitting/receiving unit 252, the web page acquisition unit 256, the print condition setting unit 260, the image searching unit 264, the print data generating unit 266, and the image processing unit 268 of the smart device 200 as shown in FIG. 4.

The print region setting unit 358 of the smart device 300 is implemented by an instruction from the CPU 202 shown in FIG. 3. The print region setting unit 358 sets a print region in a web page displayed on the display unit 212 based on print region information input by the operation input accepting unit 354 and inputs print region setting information to the print image determining unit 362. Also, when the print region setting unit 358 determines, based on the print region information, that there is a display image near text (characters) included in the print region designated by the user, the print region setting unit 358 generates print region setting information including the image information of the display image. Also, when the printing area setting unit 358 determines, based on the print region information, that there is text (characters) near a display image included in the print region designated by the user, the print region setting unit 358 may generate print region setting information including character information of the text (characters). Note that the print region setting information includes one or both of image information of a display images and character information of characters.

Also, in a case where a data format for storing the print region information is designated, the print region setting unit 358 may set the print region in the web page displayed on the display unit 212 based on the print region information input by the operation input accepting unit 354, convert the print region information into the designated data format, and store the converted print region information in the storage unit 372. Alternatively, in the case where the data format for storing the print region information is designated, the print region setting unit 358 may set the print region in the web page displayed on the display unit 212 based on the print region information input by the operation input accepting unit 354, convert the print region information into the designated data format, and store the converted print region information in a storage on a cloud that is connected to the smart device 300 via the network 50, for example.

Figure 16:
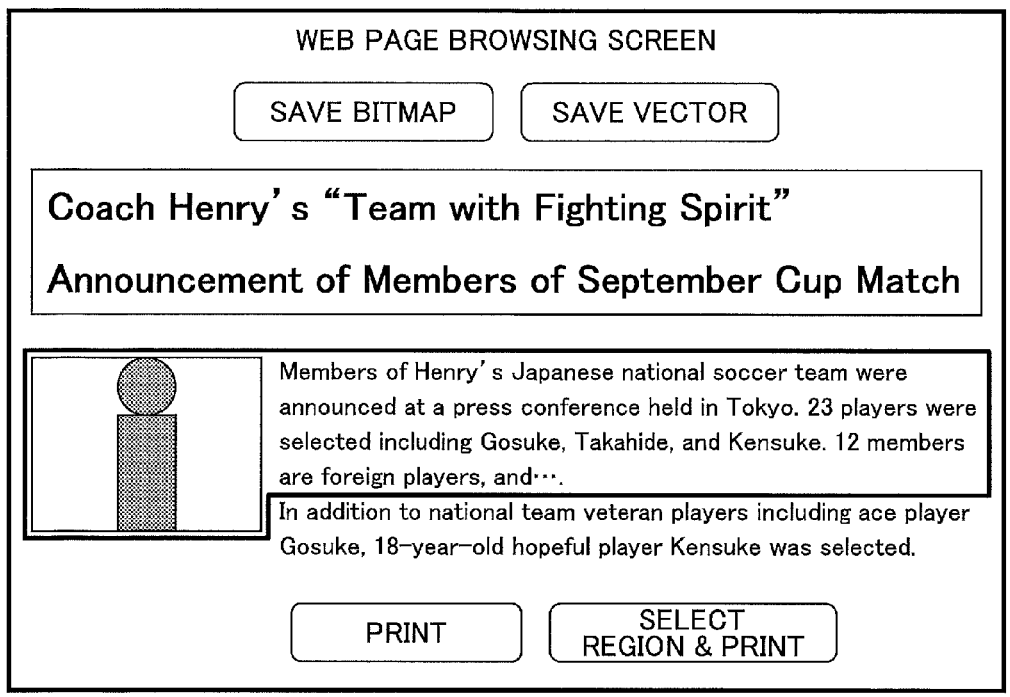
FIG. 16 is a diagram showing another example of a web page browsing screen.

FIG. 16 shows an example of a web page browsing screen displayed on the display unit 212. In addition to displaying the web page, the web page browsing screen displays a first region indicated as "print" to be pressed when printing the entire web page, and a second region indicated as "select region & print" to be pressed when selecting a specific print region to be printed. Further, the web page browsing screen displays a sixth region indicated as "save bitmap" to be pressed when saving the print region in the bitmap file format, and a seventh region indicated as "save vector" to be pressed when saving the print region in a vector format. In FIG. 16, the print region is indicated by thick lines defining a polygon.

The user of the smart device 300 may operate the operation unit I/F 210 to designate a predetermined print region in the web page browsing screen displayed on the display unit 212, and press the second region. For example, as shown in FIG. 16, the user may select a region to be printed by designating a predetermined region in the web page, and press the second region. In turn, the operation input accepting unit 354 accepts the user operation and inputs print region information to the print region setting unit 358.

Also, the user of the smart device 300 may operate the operation unit I/F 210 to designate a predetermined print region from the web page browsing screen displayed on the display unit 212 and select a data format for storing the print region information. For example, as shown in FIG. 16, the user may press the sixth region or the seventh region to select the data format for storing the print region information. When the data format for storing the print region information is selected, the operation input accepting unit 354 accepts the user operation, and inputs the data format information in the print region setting unit 358.

In the case where the sixth region indicated as "save bitmap" is pressed by the user of the smart device 300, the print region setting unit 358 converts a display screen of the web page into a bitmap file format, generates print region conversion information by extracting a portion corresponding to the print region from the display screen of the web pages that has been converted into the bitmap file format, and stores the print region conversion information in the storage unit 372. That is, the print region setting unit 358 saves the web page being displayed in the bitmap file format and extracts the bitmap of the print region. Note that extracting refers to removing unnecessary pixel portions of the web page in the bitmap file format to acquire the bitmap of a relevant portion. In this way, the size of data to be stored may be reduced. In the example shown in FIG. 16, the print region indicated by a polygon is extracted from the web page in the bitmap file format. The print region setting unit 358 stores print region conversion information, which may be a combination of image information of the extracted portion of the web page in the bitmap file format with the unnecessary pixel portions removed and clip information such as path data describing a clip, for example. Such print region conversion information may be stored and used in a case where a print region that has been selected is not immediately printed but is printed later on, for example. After the print region conversion information is stored, the print region setting unit 358 may input the print region conversion information stored in the storage unit 372 to the print image determining unit 362 when the user of the smart device 300 presses the second region indicated as "select region & print" in the web page browsing screen, for example.

In the case where the seventh region indicated as "save vector" is pressed by the user of the smart device 300, the print region setting unit 358 generates print region conversion information based on the print region information by converting image information included in the print region information into a vector format and associating clip information specifying the position of the extracted display image with the image information in the vector format, and stores the generated print region conversion information in the storage unit 372. For example, the print region setting unit 358 may convert the image information included in the print region information into PDL (page description language) such as PDF (Portable Document Format), PCL (Printer Control Language)/PS (PostScript), or a vendor-specific PDL. Note that clip information refers to information specifying the position of the image. In the case where the image has a rectangular shape, its coordinate information may be used, and in the case where the image has a more complex shape, coordinate path information representing such a shape may be used. In this way, clip information of any geometric shape may be generated.

More specifically, the print region setting unit 358 associates a serial number with the print region information, assigns the same serial number to the image information converted into the vector format and the clip information, and stores the image information in the vector format and the clip information in the storage unit 372. For example, a serial number "Web000001" may be associated with the print region information, a display screen converted into a PDF file may be stored with the file name "Web000001.pdf", and the print region such as clip information converted into a PDF file may be stored with the file name "Web000001.clip". Note that the print region converted into PDF may be a binary file arranging coordinate information. That is, the print region converted into PDF is stored as a file representing the sequence information of coordinates arranged in a program memory as is. In this way, the print region conversion information may be stored and used in a case where a print region that has been selected is not immediately printed but is printed later on, for example.

After the print region conversion information is stored, the print region setting unit 358 may input the print region conversion information stored in the storage unit 372 to the print image determining unit 362 when the user of the smart device 300 presses the second region of the web page browsing screen, for example.

The print image determining unit 362 of the smart device 300 is implemented by an instruction from the CPU 202 shown in FIG. 3. The print image determining unit 362 determines, based on the print region conversion information input by the print region setting unit 358, whether image information is included in the print region conversion information. If image information is included in the print region conversion information, the print image determining unit 362 determined, based on the image information and the print conditions input by the print condition setting unit 360, whether a printed image to be printed by the image forming apparatus 100 would be too rough and grainy. For example, in the case where the print region conversion information is a combination of image information of an extracted portion of a web page in the bitmap file format with unnecessary pixel portions removed and clip information such as path data representing a clip, the print image determining unit 362 determines, based on the image information in the bitmap file format and the print condition, whether a printed image to be printed by the image forming apparatus 100 would be too rough and grainy. Also, for example, in the case where the print region conversion information includes image information in the vector format and clip information specifying the position of the extracted display image, the print image determining unit 362 generates image information by converting the image information in the vector format into the bitmap file format based on the print conditions and combining the image information in the bitmap file format with the clip information. Then, the image determining unit 362 determines, based on the generated image information and the print conditions, whether a printed image to be printed by the image forming apparatus 100 would be too rough and grainy.

In a case where no image information is included in the print region conversion information, or even in a case where image information is included in the print region conversion information, if it is determined that a printed image based on the image information would not be too rough and grainy, the print image determining unit 362 inputs the print region conversion information to the print data generating unit 366.

On the other hand, in a case where image information is included in the print region conversion information, and it is determined that a printed image based on the image information would be too rough and grainy, the print image determining unit 362 inputs a display image search request to the image searching unit 364 to request a search for another display image (substitute image) similar to the display image represented by the image information but in a different size. If other image information of another display image is input to the print image determining unit 362 from the image searching unit 364 to the image searching unit 364 in response to the display image search request, the print image determining unit 362 determines, based on the other image information and the print conditions, whether a printed image to be printed by the image forming apparatus 100 would be too rough and grainy. If the print image determining unit 362 determines that the printed image would not be too rough and grainy, the print image determining unit 362 inputs print region conversion information including the other image information instead of the image information of the display image in the web page to the print data generating unit 366.

In a case where the print image determining unit 362 receives notification from the image searching unit 364 that no other display image could be found in response to the display image search request, or even in a case where another display image is found, if it is determined that a printed image based on the other image information of the other display image would be too rough and grainy, the print image determining unit 362 inputs a super-resolution process request to the image processing unit 368 to request the execution of a process for improving the image quality of the display image. When other image information of a super-resolution processed image is input to the print image determining unit 362 from the image processing unit 368 in response to the super-resolution process request, the print image determining unit 362 inputs print region conversion information that includes the other image information instead of the image information of the display image in the web page to the print data generating unit 366.

The print data generating unit 366 of the smart device 300 is implemented by an instruction from the CPU 202 shown in FIG. 3. The print data generating unit 366 generates print data to be transmitted to the image forming apparatus 100 based on the print region conversion information input by the print image determining unit 362, and transmits the generated print data to the image forming apparatus 100 via the transmitting/receiving unit 352.

The image layout processing unit 374 of the smart device 300 is implemented by an instruction from the CPU 202 shown in FIG. 3. The image layout processing unit 374 arranges display images included in print region information accepted by the operation accepting unit 354 in chronological order from the top of a page. For example, in a case where a plurality of bitmap image files (image information in the bitmap file format) are input to the image layout processing unit 374 from the print image determining unit 362, the image layout processing unit 374 may configure a plurality of display images on one page based on the plurality of bitmap image files, and reconvert the page into PDF or PDL, for example.

Alternatively, the plurality of display images may be configured on one page and stored in the storage unit 372 by the print region setting unit 358. For example, when the sixth region or the seventh region in the web page browsing screen shown in FIG. 16 is pressed, the print region setting unit 358 may notify the image layout processing unit 374. Upon receiving the notification that the sixth region or the seventh region has been pressed from the print region setting unit 358, the image layout processing unit 374 may direct the display control unit 370 to display a layout selection screen.

Figure 17:
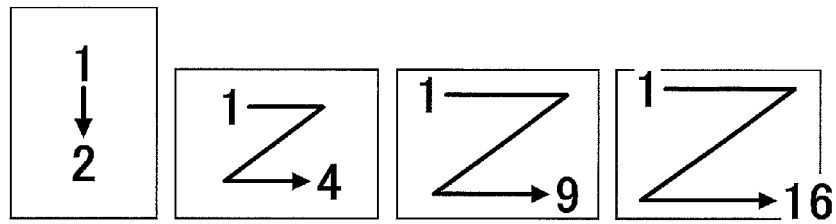
FIG. 17 is a diagram showing an example of a layout selection screen.

FIG. 17 shows an example of a layout selection screen. The layout selection screen of FIG. 17 displays an image layout for placing two display images on one page, an image layout for placing four display images on one page, an image layout for placing nine display images on one page, and an image layout for placing 16 display images on one page. Note that the layout selection screen may include other image layout options for arranging any number of display images.

The user may refer to the layout selection screen to select one of the image layouts. When one of the regions indicating the image layouts in the layout selection screen is pressed by the user to select one of the image layouts, the operation input accepting unit 354 accepts the user operation and notifies the print region setting unit 358 of the selected image layout. In turn, the print region setting unit 358 includes identification information of the selected image layout in the print region conversion information and stores the identification information and the print region conversion information in the same folder of the storage unit 372. That is, one layout pattern is applied to data stored in the same folder.

Also, in configuring a plurality of display images on one page, the position of each display image in an image layout may be specified upon storing image information of each display image, for example. In this case, the image layout of the display images may become valid when the position of the last display image is specified, and the display images included in the image layout may be arranged at their respective positions.

In the case where image layout information is included in print region conversion information, the print image determining unit 362 arranges the display images included in the image layout based on the image layout information and determines whether the printed display images would be too rough and grainy.

<Image Forming System Operation>

Figure 18:
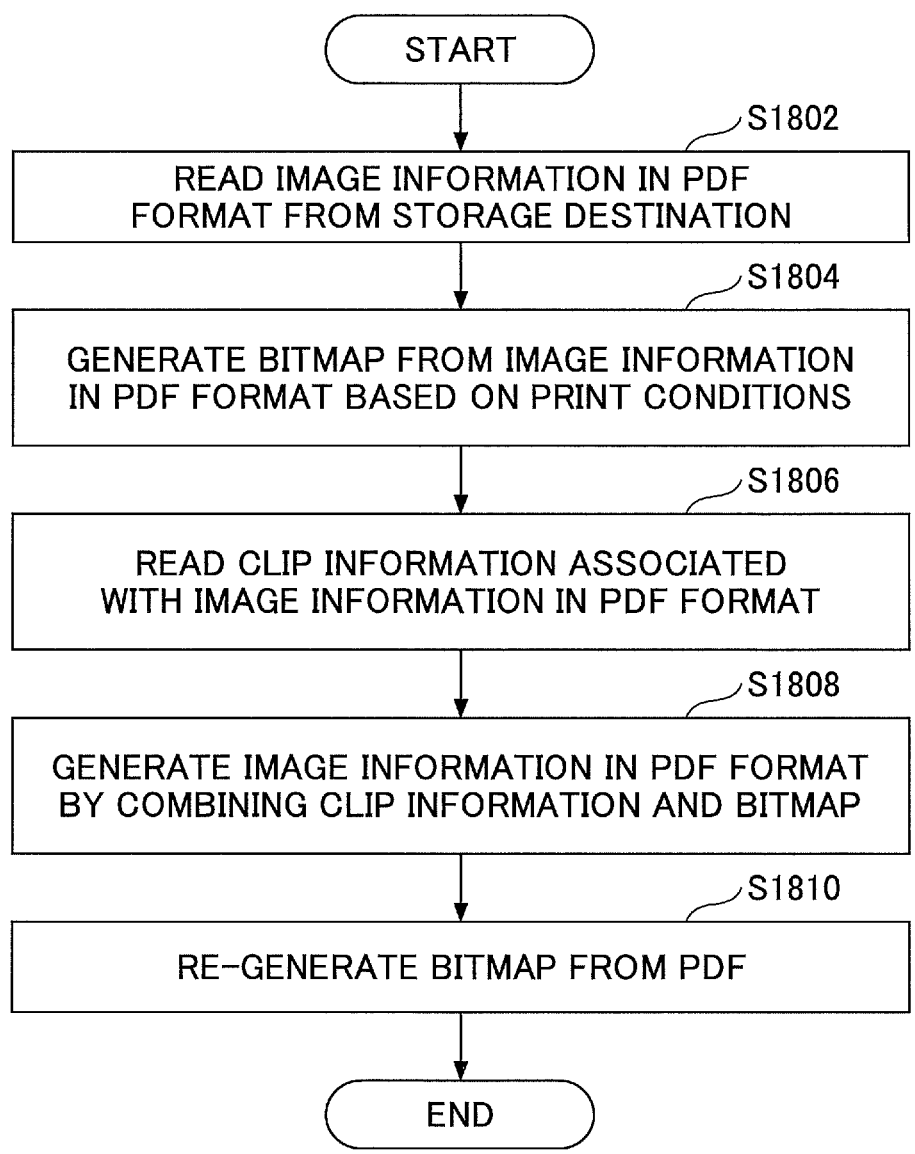
FIG. 18 is a flowchart showing a fourth operation of the image forming system according to an embodiment of the present invention.

FIG. 18 illustrates a fourth operation of the image forming system according to the present embodiment. FIG. 18 shows a process of generating information in the bitmap file format based on print region conversion information stored in the storage unit 372 of the smart device 300. Note that in FIG. 18, as an example is described where image information converted into the PDF format is included in the print region conversion information. However, the image information included in the print region conversion information is not limited to that converted into a PDF file and may be image information converted into other file formats such as a vector format, for example.

In step S1802, the print image determining unit 362 of the smart device 300 reads print region conversion information stored in the storage unit 372, and acquires the image information converted into PDF format included in the print region conversion information. The image information converted into the PDF format is information stored in a device-independent format that does not depend on attributes of a device such as the device resolution.

In step S1804, the print image determining unit 362 of the smart device 300 generates a bitmap from the image information converted into the PDF format based on the print conditions to be implemented in printing the print region. In this way, a bit map of lines and characters may be generated based on the resolution specified by the print conditions such that jagged edges and the like may be reduced, for example.

In step S1806, the print image determining unit 362 of the smart device 300 acquires clip information included in the print region conversion information.

In step S1808, the print image determining unit 362 of the smart device 300 combines the clip information and the bitmap to generate image information in the PDF format. Specifically, the print image determining unit 362 identifies the size of the bitmap based on an outer boundary rectangle of coordinates included in the clip information. The print image determining unit 362 then re-generates a PDF file based on the identified bitmap size and the clip coordinates. In this case, the PDF page size is equal to the identified bitmap size. Further, the clip coordinates and the bitmap are converted into the PDF format to generate one PDF file.

In step S1810, the PDF file generated in step S1808 is rasterized to re-generate a bitmap.

Figure 19:
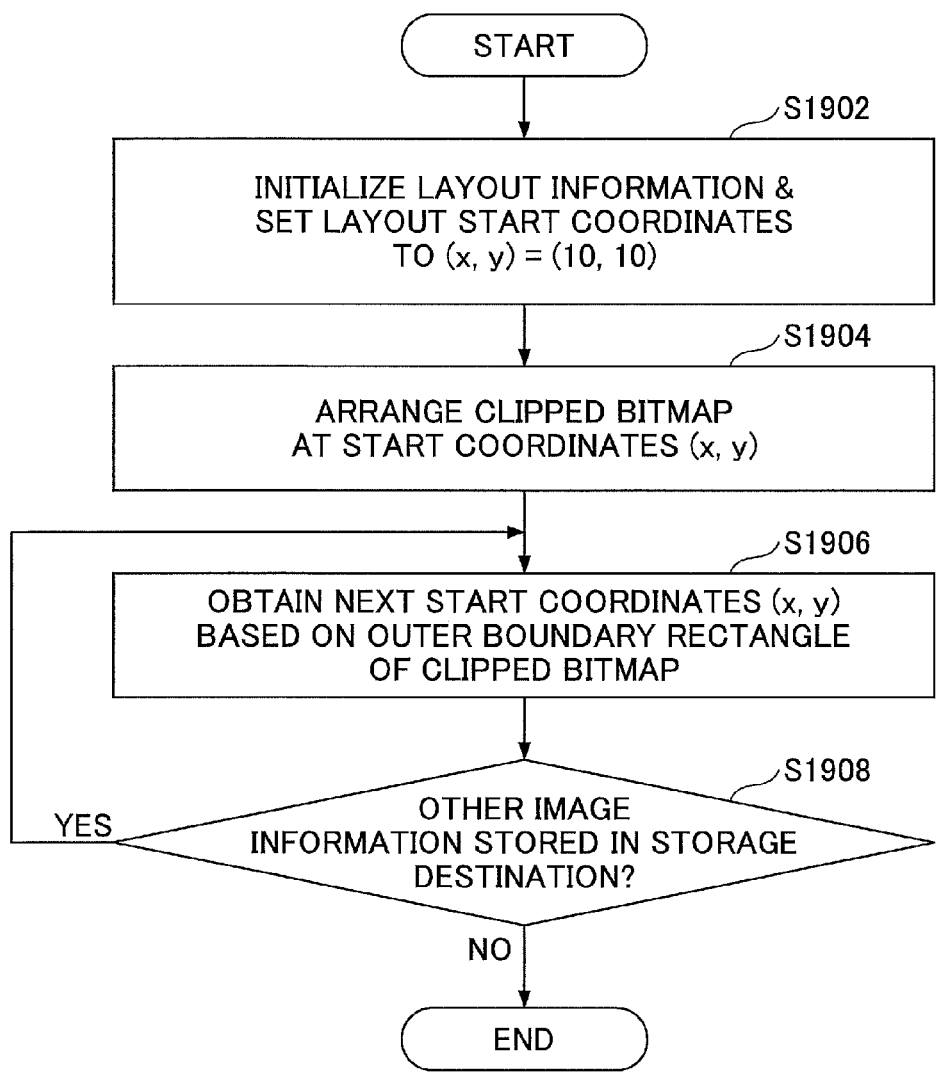
FIG. 19 is a flowchart showing a fifth operation of the image forming system according to an embodiment of the present invention.

FIG. 19 shows a fifth operation of the image forming system according to the present embodiment. FIG. 19 shows a process of generating information in the bitmap format from the print region conversion information stored in the storage unit 372 of the smart device 300. Note that in FIG. 19, an example is described where print region conversion information includes image layout information and image information in the bitmap format.

In step S1902, the print image determining unit 362 of the smart device 300 reads print region conversion information stored in the storage unit 372, and acquires image layout information included in the print region conversion information. The print image determining unit 362 initializes the layout information, and sets layout start coordinates to (x,y)=(10,10).

In step S1904, the print image determining unit 362 of the smart device 300 clips a bitmap, and arranges the clipped bitmap at the start coordinates (x,y).

In step S1906, the print image determining unit 362 of the smart device 300 obtains the next layout start coordinates based on the outer boundary rectangle of the clipped bitmap.

In step S1908, the print image determining unit 362 of the smart device 300 determines whether other image information is stored in the same folder of the storage unit 372. If other image information is stored in the same folder, the process returns to step S1906, and if no other image information is stored, the process is terminated.

Thereafter, the print image determining unit 362 may convert the clipped bitmap arranged based on the image layout information into PDL such as the PDF.

According to an aspect of the present embodiment, by storing a display image in the vector format, a bitmap may be generated based on attributes such as the resolution of an output device to be used at the time the output device (e.g., image forming apparatus) to be used is determined. Also, by storing a display image in the vector format, attribute information of characters, lines, and the like may be stored such that black characters may be clearly printed using only black toner, for example.

Further, in storing a display image in the vector format, a web page may be stored as information (file) in a vector PDF format, for example, and at the same time, coordinate information (clip information) indicating an image region to be extracted may be stored in association with the web page file. PDL such as PDF and PS/PCL may describe characters, figures, and drawing components (drawing objects) such as an image (photo image). The shapes of the drawing objects can be modified by an object called a clip. For example, as one way of cropping a photo to a heart shape, the photo may be represented as an image, and the heart shape may be represented as a graphic object with clip attributes including graphic coordinates. Such graphic object may be represented by successively arranging PDL drawing commands. That is, the photo in the desired shape may be extracted by specifying the photo image after the graphic clip.

A typical command sequence of the PDL may be divided into graphic clip, photo image, graphic clip, and character string. That is, separate clips are applied to the photo image and the character string. A display image displayed on a web page may be stored as a PDL command sequence as described above. A graphic clip has to be similarly specified for coordinate information indicating a region to be extracted. However, since graphic clips are already specified with respect to drawing objects stored in PDL (PDF), an image may not be cut out (clipped) as intended if the PDL command sequence is used as is. In order to clip an intended region, the PDL information has to be analyzed to merge the clip to be extracted with the clips applied to the objects included in the PDL information. Such a process requires performing a process similar that performed when generating a bitmap from PDF information. That is, even though the purpose of the process is to simply merge the clips, a substantial amount of time is required to implement the process. Accordingly, in order to clip a region of interest, a bitmap is generated from PDL (PDF) and a clip is applied thereafter to the bitmap.

Also, in the case of printing more than one web page, PDF data of the web pages and coordinate information (clip information) representing one or more image regions to be extracted are stored in association with each other in a same folder of a storage destination. For example, the PDF data and the clip information may be associated by being assigned the same name, where the clip information is stored with a suffix such as ".clip".

Also, when printing stored data, a print application on the smart device may be activated and used to acquire device information of the printing device such as the image forming apparatus that is to print the data. For example, the smart device may be tapped to a device such as an NFC (Near Field Communication) device to acquire device attributes such as the IP address and the resolution of the image forming apparatus. Based on the acquired printing device information, the print app of the smart device reads PDF data and clip information from a print target folder, synthesizes clip information from each PDF data set and re-synthesizes the PDF data sets. The synthesis process may involve generating a bitmap by performing a rasterization process on each PDF data set based on the attributes of the printing device. Then, bounding rectangle information of the clip information is used as the page size, and PDF data is generated based on the clip data and the bit map. A rasterization process is then performed on the PDF data such that a bitmap of an extracted region to be printed can be generated. Note that a rasterization process refers to a process of generating a bitmap from PDF data or data in some other vector format. Note that although PDF is used in the present example, the rasterization process may be applied to data in other formats such as PCL or a vendor-specific format, for example.

Further, when re-synthesis of the PDF data sets is completed, the re-synthesized PDF data set may be laid out in chronological order based on their print region information to generate a final version of PDF data to be transmitted to the image forming apparatus as print data. Note that although PDF data is generated as the final print data transmitted to the image forming apparatus in the above example, the print data does not necessarily have to be in PDF format and may be converted into PCL/PS format, or be converted into PDL supported by the image forming apparatus, for example.

In the above-described embodiments, the image forming system is an example of an information processing system, the image forming apparatus is an example of an image output apparatus, and the smart device is an example of an information processing apparatus. The print region setting unit is an example of an image acquisition unit, the print image determining unit is an example of an image determining unit, the print data generating unit is an example of an output data generating unit, and the transmitting/receiving unit in an example of a transmitting unit. Further, the print condition is an example of an output condition, and the smart device program is an example of an information processing program.

Although the present invention has been described above with respect to certain illustrative embodiments, it should be apparent to those skilled in the art that many more variations, modifications, and alterations besides those already described are possible without departing from the scope of the present invention. Also, although an apparatus according to an embodiment of the present invention has been described using functional block diagrams for convenience of explanation, the functional features of the apparatus as described above may also be implemented by hardware, or a combination of hardware and software, for example. The present invention is not limited to the embodiments described above but includes numerous other variations, modifications, alternatives, replacements within the scope of the present invention.

The present application is based on and claims the benefit of priority of Japanese Patent Application No. 2015-055301 filed on Mar. 18, 2015 the entire contents of which are hereby incorporated by reference.

What is claimed is:

1. An information processing apparatus that is connectable to an image output apparatus via a network, the information processing apparatus comprising:
    a memory storing a program; and
    a processor configured to execute the program to implement processes of
        acquiring an initial image to be output by the image output apparatus;
        determining, based on an output condition to be implemented by the image output apparatus upon outputting the initial image and image data of the initial image, whether to change the initial image to a substitute image having a higher image quality than the initial image;
        searching for the substitute image in a case where a determination is made to change the initial image to the substitute image;
        generating output data including image data of the substitute image found by the search; and
        transmitting the output data to the image output apparatus.

2. The information processing apparatus according to claim 1, wherein the processor further implements processes of
    acquiring a web page via the network; and
    acquiring an image included in a selected region of the acquired web page as the initial image to be output by the image output apparatus.

3. The information processing apparatus according to claim 1, wherein the processor further implements a process of
    determining, based on a resolution of the image output apparatus outputting the initial image, an output image size of an output image of the initial image, a pixel density of the information processing apparatus, and an image size of the initial image, whether to change the initial image to the substitute image having a higher image quality than the initial image.

4. The information processing apparatus according to claim 2, wherein the processor further implements a process of
    searching for the substitute image on another web page associated with the acquired web page.

5. The information processing apparatus according to claim 1, wherein the processor further implements processes of
    performing a super-resolution process with respect to the initial image in a case where the substitute image is not found by the search; and
    generating output data including image data of the initial image that has been super-resolution processed.

6. A non-transitory computer-readable medium storing an information processing program that when executed causes an information processing apparatus, which is connectable to an image output apparatus via a network, to perform the steps of:
    acquiring an initial image to be output by the image output apparatus;
    determining, based on an output condition to be implemented by the image output apparatus upon outputting the initial image and image data of the initial image, whether to change the initial image to a substitute image having a higher image quality than the initial image;
    searching for the substitute image in a case where a determination is made to change the initial image to the substitute image;
    generating output data including image data of the substitute image found by the search; and
    transmitting the output data to the image output apparatus.

7. An information processing system comprising:
    an image output apparatus; and
    an information processing apparatus that is connectable to the image output apparatus via a network;
    wherein the information processing apparatus includes
        a first memory storing a first program; and
        a first processor configured to execute the first program to implement processes of
            acquiring an initial image to be output by the image output apparatus;
            determining, based on an output condition to be implemented by the image output apparatus upon outputting the initial image and image data of the initial image, whether to change the initial image to a substitute image having a higher image quality than the initial image;
            searching for the substitute image in a case where a determination is made to change the initial image to the substitute image;
            generating output data including image data of the substitute image found by the search; and
            transmitting the output data to the image output apparatus; and
    wherein the image output apparatus includes
        a second memory storing a second program; and
        a second processor configured to execute the second program to implement processes of
            receiving the output data from the information processing apparatus; and
            performing a process of outputting the substitute image based on the output data.

* * * * *